US012630188B2

(12) United States Patent
Oboril et al.

(10) Patent No.: US 12,630,188 B2
(45) Date of Patent: May 19, 2026

(54) APPLICATION OF MEAN TIME BETWEEN FAILURE (MTBF) MODELS FOR AUTONOMOUS VEHICLES

(71) Applicant: Mobileye Vision Technologies Ltd., Jerusalem (IL)

(72) Inventors: Fabian Oboril, Karlsruhe (DE); Simone Fabris, Tel Aviv (IL); Alon Sussmann, Tzur Itzhak (IL); Simcha Biton Shack, Jerusalem (IL); Cornelius Buerkle, Karlsruhe (DE)

(73) Assignee: Mobileye Vision Technologies Ltd., Jerusalem (IL)

( * ) Notice: Subject to any disclaimer, the term of this patent is extended or adjusted under 35 U.S.C. 154(b) by 344 days.

(21) Appl. No.: 18/253,166

(22) PCT Filed: Aug. 16, 2022

(86) PCT No.: PCT/IB2022/057684
§ 371 (c)(1),
(2) Date: May 16, 2023

(87) PCT Pub. No.: WO2023/126695
PCT Pub. Date: Jul. 6, 2023

(65) Prior Publication Data
US 2024/0367680 A1 Nov. 7, 2024

Related U.S. Application Data

(60) Provisional application No. 63/295,618, filed on Dec. 31, 2021.

(51) Int. Cl.
*B60W 60/00* (2020.01)
*G06F 11/00* (2006.01)

(52) U.S. Cl.
CPC ....... *B60W 60/0015* (2020.02); *G06F 11/008* (2013.01)

(58) Field of Classification Search
None
See application file for complete search history.

(56) References Cited

U.S. PATENT DOCUMENTS

| | | | | |
|---|---|---|---|---|
| 12,055,941 B1 * | 8/2024 | Crego | ................. | G05D 1/0214 |
| 12,187,322 B1 * | 1/2025 | Olson | .................. | G05B 17/02 |

(Continued)

OTHER PUBLICATIONS

Nov. 10, 2022 (PCT) International Search Report and Written Opinion—App. PCT/IB2022/057684.

(Continued)

*Primary Examiner* — Lail A Kleinman
(74) *Attorney, Agent, or Firm* — Banner & Witcoff, Ltd.

(57) ABSTRACT

To receive authority certification for mass deployment of autonomous vehicles (AVs), manufacturers need to justify that their AVs operate safer than human drivers. This in turn creates the need to estimate and model the collision rate (failure rate) of an AV taking all possible errors and driving situations into account. In other words, there is the strong demand for comprehensive Mean Time between Failure (MTBF) models for AVs. The disclosure describes such a generic and scalable model that creates a link between errors in the perception system to vehicle-level failures (collisions). Using this model, requirements for the perception quality may then be derived based on the desired vehicle-level MTBF, or vice versa, to obtain an MTBF value given a certain mission profile and perception quality.

25 Claims, 21 Drawing Sheets

100

(56) References Cited

U.S. PATENT DOCUMENTS

| | | | | |
|---|---|---|---|---|
| 2019/0258251 A1* | 8/2019 | Ditty | .................... | G05D 1/0274 |
| 2021/0018590 A1* | 1/2021 | Grau | .................... | G05D 1/0055 |
| 2021/0097148 A1 | 4/2021 | Bagschik et al. | | |
| 2021/0201464 A1* | 7/2021 | Tariq | ..................... | G06V 20/56 |
| 2022/0340149 A1* | 10/2022 | Nister | .............. | B60W 50/0205 |
| 2023/0059697 A1* | 2/2023 | Alford | ................... | G06N 3/094 |
| 2023/0356755 A1* | 11/2023 | Tang | .................... | B60W 50/14 |

OTHER PUBLICATIONS

F. Oboril, et al., "MTBF Model for AVs—From Perception Errors to Vehicle-Level Failures", IEEE Intelligent Vehicles Symposium, 8 pgs., Jun. 4, 2022.

* cited by examiner

300

Failure at Vehicle-Level (i.e. Collision)

Perception Error

Driving Situation

Mission Profile

600

750

$p_{S_2,1,1,3}$ $p_{S_2,1,1,2}$ $p_{S_2,1,1,1}$ 706.1

Speed Range 1
(e.g. 80-100km/h)

758.1

Lead Speed
100 - 180 km/h

Lead Speed
50 - 100 km/h

Lead Speed
< 50 km/h

Lead Vehicle Accelerating
& AV within relevant distance

Lead Vehicle Driving w/ constant speed
& AV within relevant distance

Lead Vehicle
Decelerating $\lambda_{p_2,1,1,1}$ 760.1

Type II Perception Error

Velocity &
Distance
Error

Perception
Miss

900

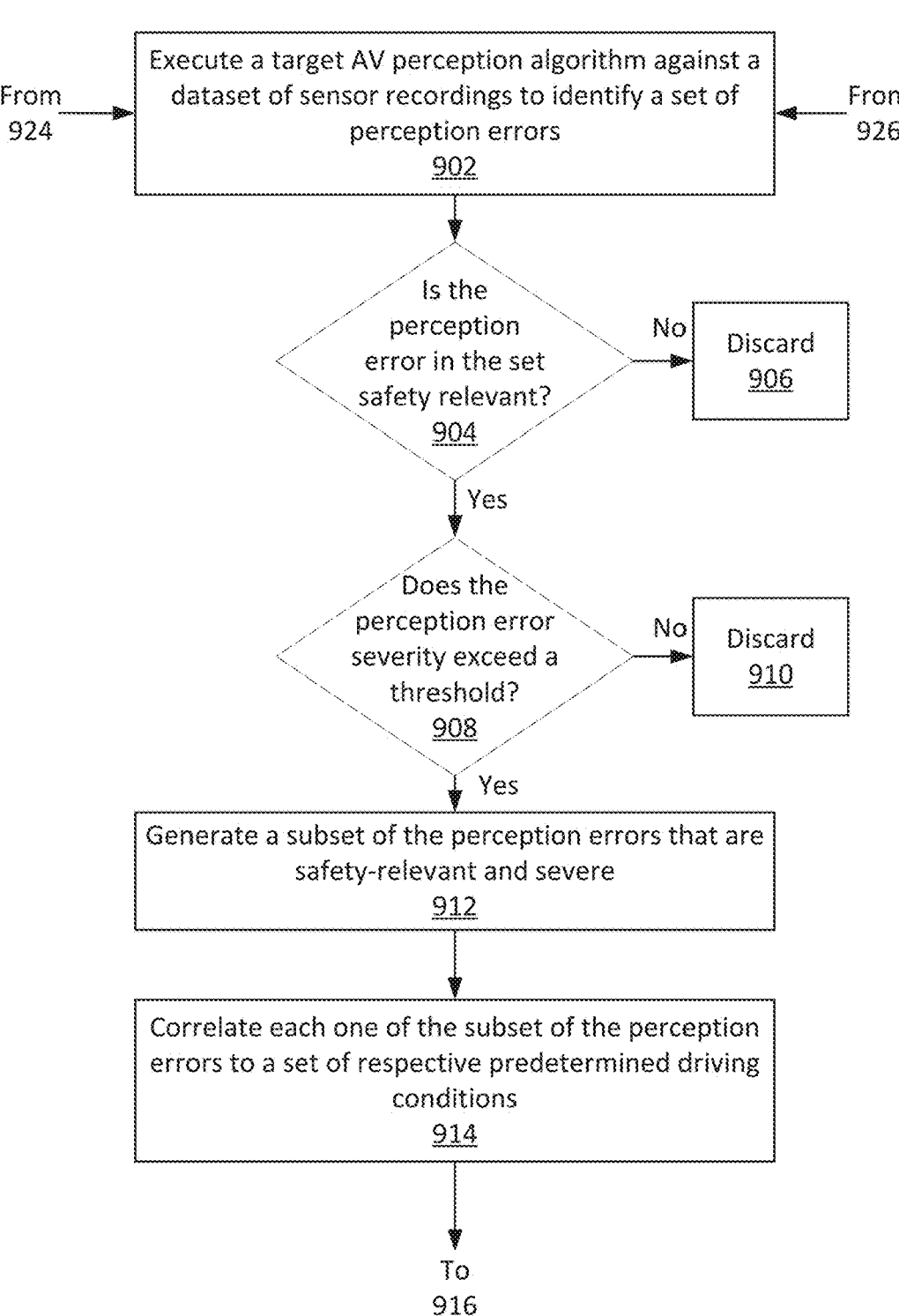

From
924

Execute a target AV perception algorithm against a
dataset of sensor recordings to identify a set of
perception errors
902

From
926

Is the
perception
error in the set
safety relevant?
904

No

Discard
906

Yes

Does the
perception error
severity exceed a
threshold?
908

No

Discard
910

Yes

Generate a subset of the perception errors that are
safety-relevant and severe
912

Correlate each one of the subset of the perception
errors to a set of respective predetermined driving
conditions
914

Figure 10:
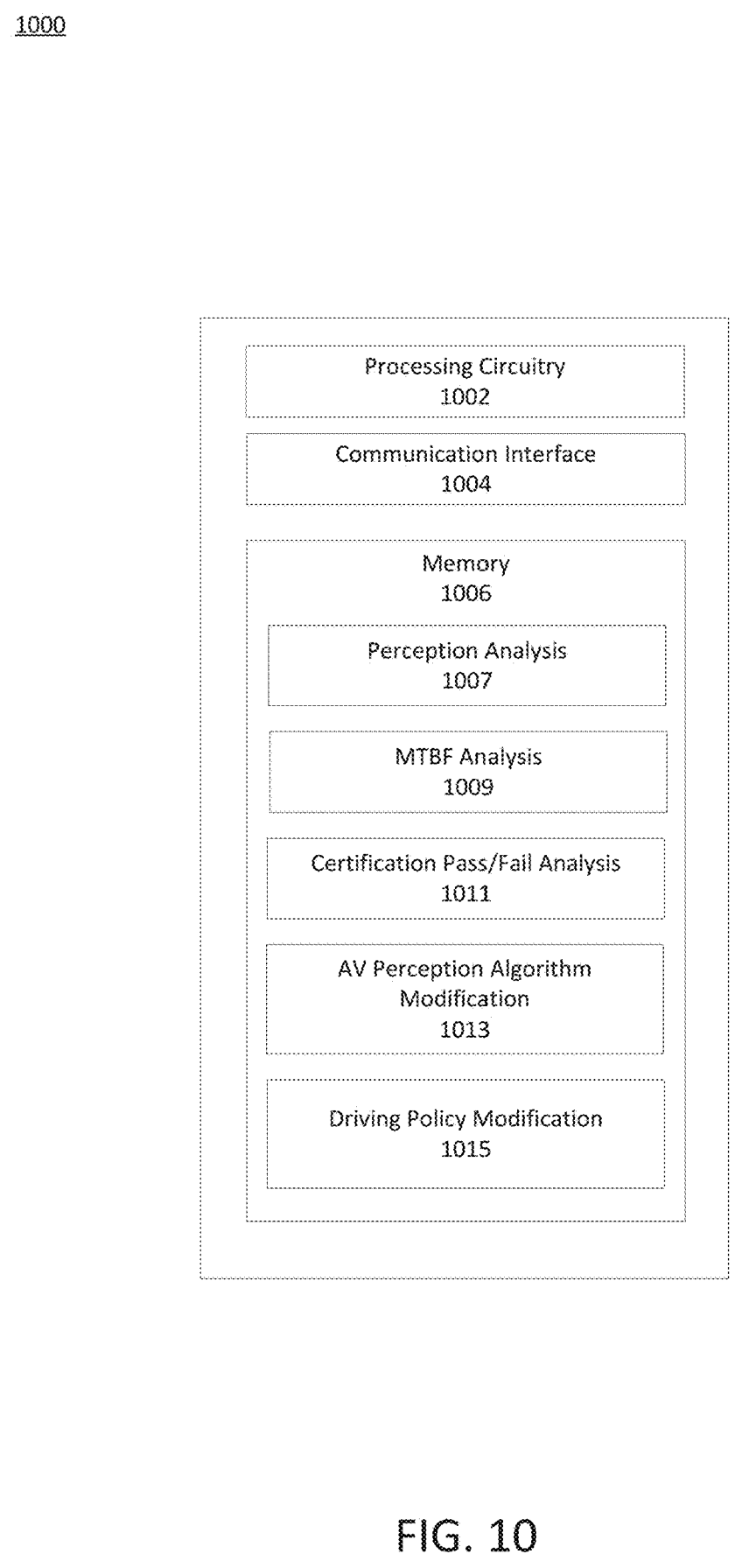

Processing Circuitry
1002

Communication Interface
1004

Memory
1006

Perception Analysis
1007

MTBF Analysis
1009

Certification Pass/Fail Analysis
1011

AV Perception Algorithm
Modification
1013

Driving Policy Modification
1015

(a) Speed distribution for cars

1200

1240

1300

1320

APPLICATION OF MEAN TIME BETWEEN FAILURE (MTBF) MODELS FOR AUTONOMOUS VEHICLES

CROSS-REFERENCE TO RELATED APPLICATIONS

This Application is a U.S. National Stage entry of PCT application no. PCT/IB22/57684, filed on Aug. 16, 2022, which claims priority to provisional application no. 63,295, 618, filed on Dec. 31, 2021, the contents of each of which are incorporated herein by reference in their entireties.

TECHNICAL FIELD

Aspects described herein generally relate to the application of mean time between failure (MTBF) probability models and, in particular, to the use of MTBF models that identify MTBFs correlated to perception errors of autonomous vehicles, which may be used in the development, certification, and deployment of AV systems.

BACKGROUND

To receive authority certification for mass deployment of autonomous vehicles (AVs), manufactures need to justify that their AVs operate safer than human drivers. This in turn creates the need to estimate and model the collision rate (failure rate) of an AV taking all possible errors and driving situations into account In other words, there is the strong demand for comprehensive Mean Time between Failure (MTBF) models for AVs.

BRIEF DESCRIPTION OF THE DRAWINGS/FIGURES

The accompanying drawings, which are incorporated herein and form a part of the specification, illustrate the aspects of the present disclosure and, together with the description, and further serve to explain the principles of the aspects and to enable a person skilled in the pertinent art to make and use the aspects.

FIGS. 9A-9B illustrate an example process flow, in accordance with one or more aspects of the present disclosure;

FIG. 10 illustrates an example computing device, in accordance with one or more aspects of the present disclosure;

The exemplary aspects of the present disclosure will be described with reference to the accompanying drawings. The drawing in which an element first appears is typically indicated by the leftmost digit(s) in the corresponding reference number.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Autonomous Vehicle Architecture and Operation

Figure 1:
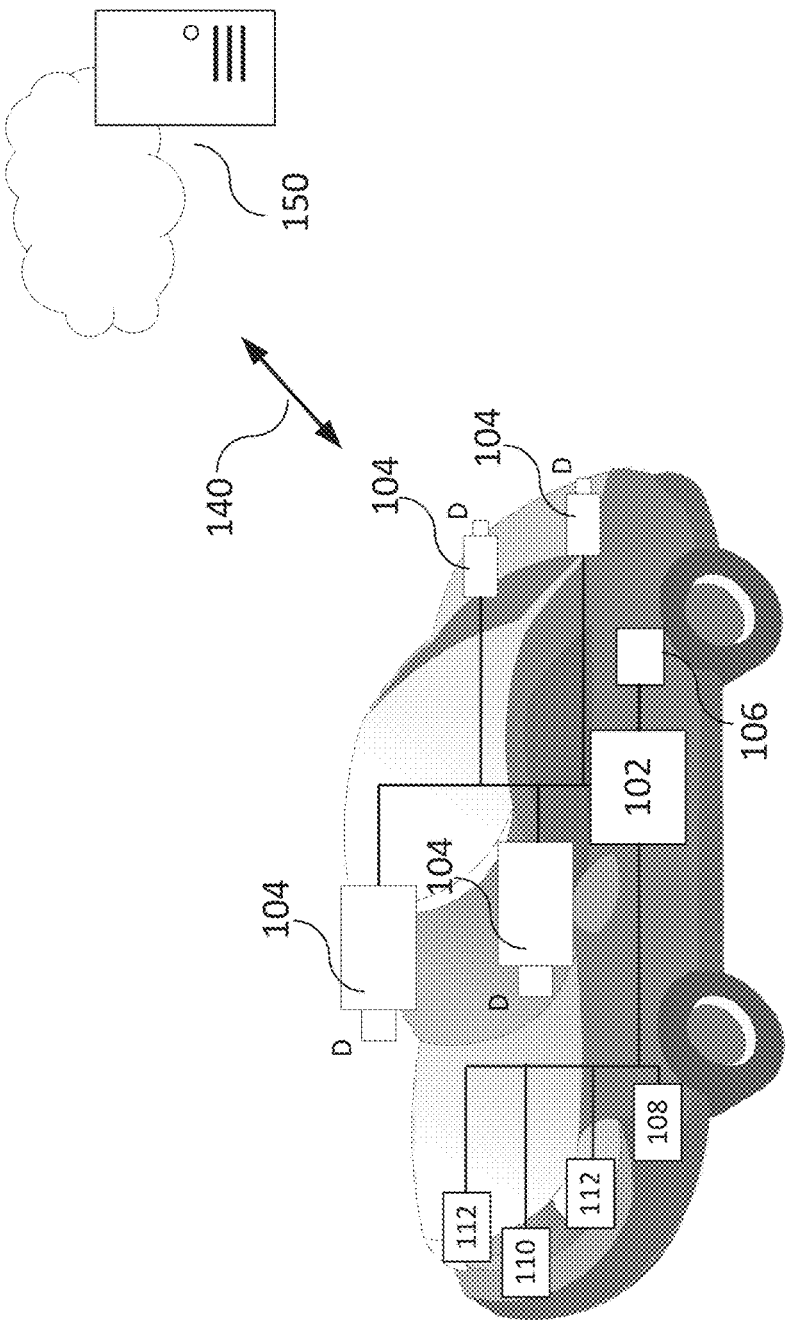
FIG. 1 illustrates an example vehicle in accordance with one or more aspects of the present disclosure.

FIG. 1 shows a vehicle 100 including a safety system 200 (see also FIG. 2) in accordance with various aspects of the present disclosure. The vehicle 100 and the safety system 200 are exemplary in nature, and may thus be simplified for explanatory purposes. Locations of elements and relational distances (as discussed herein, the Figures are not to scale) and are provided by way of example and not limitation. The safety system 200 may include various components depending on the requirements of a particular implementation and/or application, and may facilitate the navigation and/or control of the vehicle 100. The vehicle 100 may be an autonomous vehicle (AV), which may include any level of automation (e.g. levels 0-5), which includes no automation or full automation (level 5). The vehicle 100 may implement the safety system 200 as part of any suitable type of autonomous or driving assistance control system, including AV and/or advanced driver-assistance system (ADAS), for instance. The safety system 200 may include one or more components that are integrated as part of the vehicle 100 during manufacture, part of an add-on or aftermarket device, or combinations of these. Thus, the various components of the safety system 200 as shown in FIG. 2 may be integrated as part of the vehicle's systems and/or part of an aftermarket system that is installed in the vehicle 100.

The one or more processors 102 may be integrated with or separate from an engine control unit (ECU) of the vehicle 100 or an engine control unit of the vehicle 100, which may be considered herein as a specialized type of an electronic control unit. The safety system 200 may generate data to control or assist to control the ECU and/or other components of the vehicle 100 to directly or indirectly control the driving of the vehicle 100. However, the aspects described herein are not limited to implementation within autonomous or semi-autonomous vehicles, as these are provided by way of example. The aspects described herein may be implemented as part of any suitable type of vehicle that may be capable of travelling with or without any suitable level of human assistance in a particular driving environment. Therefore, one or more of the various vehicle components such as those discussed herein with reference to FIG. 2 for instance, may be implemented as part of a standard vehicle (i.e. a vehicle not using autonomous driving functions), a fully autonomous vehicle, and/or a semi-autonomous vehicle, in various aspects. In aspects implemented as part of a standard vehicle, it is understood that the safety system 200 may perform alternate functions, and thus in accordance with such aspects the safety system 200 may alternatively represent any suitable type of system that may be implemented by a standard vehicle without necessarily utilizing autonomous or semi-autonomous control related functions.

Figure 2:
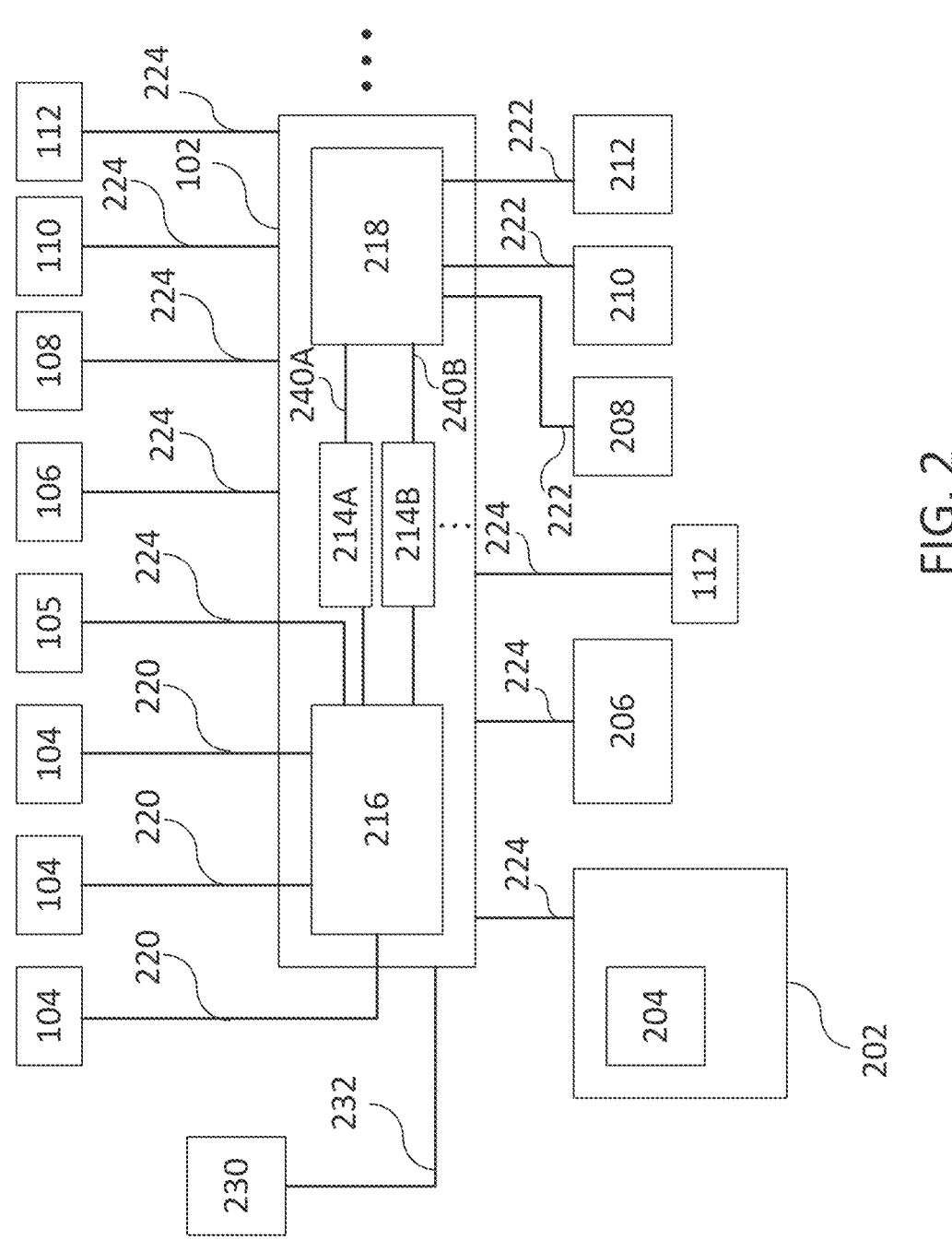
FIG. 2 illustrates various example electronic components of a safety system of a vehicle in accordance with one or more aspects of the present disclosure.

Regardless of the particular implementation of the vehicle 100 and the accompanying safety system 200 as shown in FIG. 1 and FIG. 2, the safety system 200 may include one or more processors 102, one or more image acquisition devices 104 such as, e.g., one or more cameras or any other suitable sensor configured to perform image acquisition over any suitable range of wavelengths, one or more position sensors 106, which may be implemented as a position and/or location-identifying system such as a Global Navigation Satellite System (GNSS), e.g., a Global Positioning System (GPS), one or more memories 202, one or more map databases 204, one or more user interfaces 206 (such as, e.g., a display, a touch screen, a microphone, a loudspeaker, one or more buttons and/or switches, and the like), and one or more wireless transceivers 208, 210, 212.

The wireless transceivers 208, 210, 212 may be configured to operate in accordance with any suitable number and/or type of desired radio communication protocols or standards. By way of example, a wireless transceiver (e.g., a first wireless transceiver 208) may be configured in accordance with a Short Range mobile radio communication standard such as e.g. Bluetooth, Zigbee, and the like. As another example, a wireless transceiver (e.g., a second wireless transceiver 210) may be configured in accordance with a Medium or Wide Range mobile radio communication standard such as e.g. a 3G (e.g. Universal Mobile Telecommunications System—UMTS), a 4G (e.g. Long Term Evolution—LTE), or a 5G mobile radio communication standard in accordance with corresponding 3GPP (3rd Generation Partnership Project) standards, the most recent version at the time of this writing being the 3GPP Release 16 (2020).

As a further example, a wireless transceiver (e.g., a third wireless transceiver 212) may be configured in accordance with a Wireless Local Area Network communication protocol or standard such as e.g. in accordance with IEEE 802.11 Working Group Standards, the most recent version at the time of this writing being IEEE Std 802.11™-2020, published Feb. 26, 2021 (e.g. 802.11, 802.11a, 802.11b, 802.11g, 802.11n, 802.11p, 802.11-12, 802.11ac, 802.11 ad, 802.11ah, 802.11ax, 802.11ay, and the like). The one or more wireless transceivers 208, 210, 212 may be configured to transmit signals via an antenna system (not shown) using an air interface. As additional examples, one or more of the transceivers 208, 210, 212 may be configured to implement one or more vehicle to everything (V2X) communication protocols, which may include vehicle to vehicle (V2V), vehicle to infrastructure (V2I), vehicle to network (V2N), vehicle to pedestrian (V2P), vehicle to device (V2D), vehicle to grid (V2G), and any other suitable communication protocols.

One or more of the wireless transceivers 208, 210, 212 may additionally or alternatively be configured to enable communications between the vehicle 100 and one or more other remote computing devices via one or more wireless links 140. This may include, for instance, communications with a remote server or other suitable computing system 150 as shown in FIG. 1. The example shown FIG. 1 illustrates such a remote computing system 150 as a cloud computing system, although this is by way of example and not limitation, and the computing system 150 may be implemented in accordance with any suitable architecture and/or network and may constitute one or several physical computers, servers, processors, etc. that comprise such a system. As another example, the computing system 150 may be implemented as an edge computing system and/or network.

The one or more processors 102 may implement any suitable type of processing circuitry, other suitable circuitry, memory, etc., and utilize any suitable type of architecture. The one or more processors 102 may be configured as a controller implemented by the vehicle 100 to perform various vehicle control functions, navigational functions, etc. For example, the one or more processors 102 may be configured to function as a controller for the vehicle 100 to analyze sensor data and received communications, to calculate specific actions for the vehicle 100 to execute for navigation and/or control of the vehicle 100, and to cause the corresponding action to be executed, which may be in accordance with an AV or ADAS system, for instance. The one or more processors and/or the safety system 200 may form the entirety of or portion of an advanced driver-assistance system (ADAS).

Moreover, one or more of the processors 214A, 214B, 216, and/or 218 of the one or more processors 102 may be configured to work in cooperation with one another and/or with other components of the vehicle 100 to collect information about the environment (e.g., sensor data, such as images, depth information (for a Lidar for example), etc.). In this context, one or more of the processors 214A, 214B, 216, and/or 218 of the one or more processors 102 may be referred to as "processors." The processors may thus be implemented (independently or together) to create mapping information from the harvested data, e.g., Road Segment Data (RSD) information that may be used for Road Experience Management (REM) mapping technology, the details of which are further described below. As another example, the processors can be implemented to process mapping information (e.g. roadbook information used for REM mapping technology) received from remote servers over a wireless communication link (e.g. link 140) to localize the vehicle 100 on an AV map, which can be used by the processors to control the vehicle 100.

The one or more processors 102 may include one or more application processors 214A, 214B, an image processor 216, a communication processor 218, and may additionally or alternatively include any other suitable processing device, circuitry, components, etc. not shown in the Figures for purposes of brevity. Similarly, image acquisition devices 104 may include any suitable number of image acquisition devices and components depending on the requirements of a particular application. Image acquisition devices 104 may include one or more image capture devices (e.g., cameras, charge coupling devices (CCDs), or any other type of image sensor). The safety system 200 may also include a data interface communicatively connecting the one or more processors 102 to the one or more image acquisition devices 104. For example, a first data interface may include any wired and/or wireless first link 220, or first links 220 for transmitting image data acquired by the one or more image acquisition devices 104 to the one or more processors 102, e.g., to the image processor 216.

The wireless transceivers 208, 210, 212 may be coupled to the one or more processors 102, e.g., to the communication processor 218, e.g., via a second data interface. The second data interface may include any wired and/or wireless second link 222 or second links 222 for transmitting radio transmitted data acquired by wireless transceivers 208, 210, 212 to the one or more processors 102, e.g., to the communication processor 218. Such transmissions may also include communications (one-way or two-way) between the vehicle 100 and one or more other (target) vehicles in an environment of the vehicle 100 (e.g., to facilitate coordination of navigation of the vehicle 100 in view of or together with other (target) vehicles in the environment of the vehicle 100), or even a broadcast transmission to unspecified recipients in a vicinity of the transmitting vehicle 100.

The memories 202, as well as the one or more user interfaces 206, may be coupled to each of the one or more processors 102, e.g., via a third data interface. The third data interface may include any wired and/or wireless third link 224 or third links 224. Furthermore, the position sensors 106 may be coupled to each of the one or more processors 102, e.g., via the third data interface.

Each processor 214A, 214B, 216, 218 of the one or more processors 102 may be implemented as any suitable number and/or type of hardware-based processing devices (e.g. processing circuitry), and may collectively, i.e. with the one or more processors 102 form one or more types of controllers as discussed herein. The architecture shown in FIG. 2 is provided for ease of explanation and as an example, and the vehicle 100 may include any suitable number of the one or more processors 102, each of which may be similarly configured to utilize data received via the various interfaces and to perform one or more specific tasks.

For example, the one or more processors 102 may form a controller that is configured to perform various control-related functions of the vehicle 100 such as the calculation and execution of a specific vehicle following speed, velocity, acceleration, braking, steering, trajectory, etc. As another example, the vehicle 100 may, in addition to or as an alternative to the one or more processors 102, implement other processors (not shown) that may form a different type of controller that is configured to perform additional or alternative types of control-related functions. Each controller may be responsible for controlling specific subsystems and/or controls associated with the vehicle 100. In accordance with such aspects, each controller may receive data from respectively coupled components as shown in FIG. 2 via respective interfaces (e.g. 220, 222, 224, 232, etc.), with the wireless transceivers 208, 210, and/or 212 providing data to the respective controller via the second links 222, which function as communication interfaces between the respective wireless transceivers 208, 210, and/or 212 and each respective controller in this example.

To provide another example, the application processors 214A, 214B may individually represent respective controllers that work in conjunction with the one or more processors 102 to perform specific control-related tasks. For instance, the application processor 214A may be implemented as a first controller, whereas the application processor 214B may be implemented as a second and different type of controller that is configured to perform other types of tasks as discussed further herein. In accordance with such aspects, the one or more processors 102 may receive data from respectively coupled components as shown in FIG. 2 via the various interfaces 220, 222, 224, 232, etc., and the communication processor 218 may provide communication data received from other vehicles (or to be transmitted to other vehicles) to each controller via the respectively coupled links 240A, 240B, which function as communication interfaces between the respective application processors 214A, 214B and the communication processors 218 in this example.

The one or more processors 102 may additionally be implemented to communicate with any other suitable components of the vehicle 100 to determine a state of the vehicle while driving or at any other suitable time. For instance, the vehicle 100 may include one or more vehicle computers, sensors. ECUs, interfaces, etc., which may collectively be referred to as vehicle components 230 as shown in FIG. 2. The one or more processors 102 are configured to communicate with the vehicle components 230 via an additional data interface 232, which may represent any suitable type of links and operate in accordance with any suitable communication protocol (e.g. CAN bus communications). Using the data received via the data interface 232, the one or more processors 102 may determine any suitable type of vehicle status information such as the current drive gear, current engine speed, acceleration capabilities of the vehicle 100, etc. As another example, various metrics used to control the speed, acceleration, braking, steering, etc. may be received via the vehicle components 230, which may include receiving any suitable type of signals that are indicative of such metrics or varying degrees of how such metrics vary over time (e.g. brake force, wheel angle, reverse gear, etc.).

The one or more processors 102 may include any suitable number of other processors 214A, 214B, 216, 218, each of which may comprise processing circuitry such as sub-processors, a microprocessor, pre-processors (such as an image pre-processor), graphics processors, a central processing unit (CPU), support circuits, digital signal processors, integrated circuits, memory, or any other types of devices suitable for running applications and for data processing (e.g. image processing, audio processing, etc.) and analysis and/or to enable vehicle control to be functionally realized. In some aspects, each processor 214A, 214B, 216, 218 may include any suitable type of single or multi-core processor, microcontroller, central processing unit, etc. These processor types may each include multiple processing units with local memory and instruction sets. Such processors may include video inputs for receiving image data from multiple image sensors, and may also include video out capabilities.

Any of the processors 214A, 214B, 216, 218 disclosed herein may be configured to perform certain functions in accordance with program instructions, which may be stored in the local memory of each respective processor 214A, 214B, 216, 218, or accessed via another memory that is part of the safety system 200 or external to the safety system 200. This memory may include the one or more memories 202. Regardless of the particular type and location of memory, the memory may store software and/or executable (i.e. computer-readable) instructions that, when executed by a relevant processor (e.g., by the one or more processors 102, one or more of the processors 214A, 214B, 216, 218, etc.), controls the operation of the safety system 200 and may perform other functions such those identified with the aspects described in further detail below.

A relevant memory accessed by the one or more processors 214A, 214B, 216, 218 (e.g. the one or more memories 202) may also store one or more databases and image processing software, as well as a trained system, such as a neural network, or a deep neural network, for example, that may be utilized to perform the tasks in accordance with any of the aspects as discussed herein. A relevant memory accessed by the one or more processors 214A, 214B, 216, 218 (e.g. the one or more memories 202) may be implemented as any suitable number and/or type of non-transitory computer-readable medium such as random access memories, read only memories, flash memories, disk drives, optical storage, tape storage, removable storage, or any other suitable types of storage.

The components associated with the safety system 200 as shown in FIG. 2 are illustrated for ease of explanation and by way of example and not limitation. The safety system 200 may include additional, fewer, or alternate components as shown and discussed herein with reference to FIG. 2. Moreover, one or more components of the safety system 200 may be integrated or otherwise combined into common processing circuitry components or separated from those shown in FIG. 2 to form distinct and separate components. For instance, one or more of the components of the safety system 200 may be integrated with one another on a common die or chip. As an illustrative example, the one or more processors 102 and the relevant memory accessed by the one or more processors 214A, 214B, 216, 218 (e.g. the one or more memories 202) may be integrated on a common chip, die, package, etc., and together comprise a controller or system configured to perform one or more specific tasks or functions.

In some aspects, the safety system 200 may further include components such as a speed sensor 108 (e.g. a speedometer) for measuring a speed of the vehicle 100. The safety system 200 may also include one or more sensors 105, which may include one or more accelerometers (either single axis or multiaxis) for measuring accelerations of the vehicle 100 along one or more axes, and additionally or alternatively one or more gyro sensors. The one or more sensors 105 may further include additional sensors or different sensor types such as an ultrasonic sensor, infrared sensors, a thermal sensor, digital compasses, and the like. The safety system 200 may also include one or more radar sensors 110 and one or more LIDAR sensors 112 (which may be integrated in the head lamps of the vehicle 100). The radar sensors 110 and/or the LIDAR sensors 112 may be configured to provide pre-processed sensor data, such as radar target lists or LIDAR target lists. The third data interface (e.g., one or more links 224) may couple the one or more sensors 105, the speed sensor 108, the one or more radar sensors 110, and the one or more LIDAR sensors 112 to at least one of the one or more processors 102.

Data referred to as REM map data (or alternatively as roadbook map data) may also be stored in a relevant memory accessed by the one or more processors 214A, 214B, 216, 218 (e.g. the one or more memories 202) or in any suitable location and/or format, such as in a local or cloud-based database, accessed via communications between the vehicle and one or more external components (e.g. via the transceivers 208, 210, 212), etc. Regardless of where the Roadbook Map data is stored and/or accessed, the Roadbook Map data may include a geographic location of known and non-transient landmarks that are readily identifiable (e.g., by the safety system 200 or similar ADAS systems) in the navigated environment in which the vehicle 100 travels. The location of the landmarks may be generated from a historical accumulation from other vehicles driving on the same road that collect data regarding the appearance and/or location of landmarks (e.g. "crowd sourcing"). Thus, each landmark may be correlated to a set of predetermined geographic coordinates that has already been established. Therefore, in addition to the use of location-based sensors such as GNSS, the database of landmarks provided by the Roadbook Map data enables the vehicle 100 to identify the landmarks using the one or more image acquisition devices 104. Once identified, the vehicle 100 may implement other sensors such as LIDAR, accelerometers, speedometers, etc. or images from the image acquisitions device 104, to evaluate the position and location of the vehicle 100 with respect to the identified landmark positions and in-between landmarks. For example, ego motion obtained from processing of a plurality of images can be used to determine the location of the vehicle in certain locations of the vehicle. Ego-motion signal for sensors on board the vehicle or from images tend to show a cumulative drift and is thus used in REM in conjunction with the landmarks (that are associated with a predefined location) to correct ego-motion errors. This configuration is used to maintain localization error at a level that is suitable for AV/ADAS control functions.

Furthermore, the vehicle 100 may determine its own motion (i.e. ego-motion) to track the position and orientation of the vehicle 100 with respect to the identified known landmarks. Ego-motion is generally used for computer vision algorithms and other similar algorithms to represent the motion of a vehicle camera across a plurality of frames, which provides a baseline (i.e. a spatial relationship) that can be used to compute the 3D structure of a scene from respective images. The vehicle 100 may analyze the ego-motion to determine the position and orientation of the vehicle 100 with respect to the identified known landmarks and inbetween landmarks. Because the landmarks are identified with predetermined geographic coordinates, the vehicle 100 may determine its position on a map based upon a determination of its position with respect to identified landmarks using the landmark-correlated geographic coordinates. Doing so provides distinct advantages that combine the benefits of smaller scale position tracking with the reliability of GNSS positioning systems while avoiding the disadvantages of both systems. It is further noted that the analysis of ego motion in this manner is one example of an algorithm that may be implemented with monocular imaging to determine a relationship between a vehicle's location and the known location of known landmark(s), thus assisting the vehicle to localize itself. However, ego-motion is not necessary or relevant for other types of technologies, and therefore is not essential for localizing using monocular imaging. Thus, in accordance with the aspects as described herein, the vehicle 100 may leverage any suitable type of localization technology.

Thus, the Roadbook Map data is generally constructed as part of a series of steps, which may involve any suitable number of vehicles that opt into the data collection process. For instance. Road Segment Data (RSD) is collected as part of a harvesting step. As each vehicle collects data, the data is then transmitted to the cloud or to another suitable external location as data points. A suitable computing device (e.g. a cloud server) then analyzes the data points from individual drives on the same road, and aggregates and aligns these data points with one another. After alignment has been performed, the data points are used to define a precise outline of the road infrastructure and of the drivable paths or target trajectories. Next, relevant semantics are identified that enable vehicles to understand the immediate driving environment, i.e. features and objects are defined that are linked to the classified data points. The features and objects defined in this manner may include, for instance, traffic lights, road arrows, signs, road edges, drivable paths, lane split points, stop lines, lane markings, etc. to the driving environment so that a vehicle may readily identify these features and objects using the REM map data. This information is then compiled into a roadbook map, which constitutes a bank of driving paths, semantic road information such as features and objects, and aggregated driving behavior.

The map database 204, which may be stored as part of the one or more memories 202 or accessed via the computing system 150 via the link(s) 140, for instance, may include any suitable type of database configured to store (digital) map data for the vehicle 100, e.g., for the safety system 200. The one or more processors 102 may download information to the map database 204 over a wired or wireless data connection (e.g. the link(s) 140) using a suitable communication network (e.g., over a cellular network and/or the Internet, etc.). Again, the map database 204 may store the Roadbook Map data, which includes data relating to the position, in a reference coordinate system, of various landmarks such as items, including roads, water features, geographic features, businesses, points of interest, restaurants, gas stations, etc.

The map database 204 may thus store, as part of the Roadbook Map data, not only the locations of such landmarks, but also descriptors relating to those landmarks, including, for example, names associated with any of the stored features, and may also store information relating to details of the items such as a precise position and orientation of items. In some cases, the Roadbook Map data may store a sparse data model including polynomial representations of certain road features (e.g., lane markings) or target trajectories for the vehicle 100. The Roadbook Map data may also include stored representations of various recognized landmarks that may be provided to determine or update a known position of the vehicle 100 with respect to a target trajectory. The landmark representations may include data fields such as landmark type, landmark location, etc., among other potential identifiers. In some embodiments, the Roadbook Map data may also include non-semantic features including point clouds of certain objects or features in the environment, and feature point and descriptors.

The map database 204 may be augmented with data in addition to the Roadbook Map data, and/or the map database 204 and/or the Roadbook Map data may reside partially or entirely as part of the remote computing system 150. As discussed herein, the location of known landmarks and map database information, which may be stored in the map database 204 and/or the remote computing system 150, may form what is referred to herein as a "Roadbook Map data." Thus, the one or more processors 102 may process sensory information (such as images, radar signals, depth information from LIDAR or stereo processing of two or more images) of the environment of the vehicle 100 together with position information, such as GPS coordinates, a vehicle's ego-motion, etc., to determine a current location and/or orientation of the vehicle 100 relative to the known landmarks by using information contained in the Roadbook Map. The determination of the vehicle's location may thus be refined in this manner. Certain aspects of this technology may additionally or alternatively be included in a localization technology such as a mapping and routing model.

Safety Driving Model

Furthermore, the safety system 200 may implement a safety driving model or SDM (also referred to as a "driving policy model," "driving policy," or simply as a "driving model"), e.g., which may be utilized and/or executed as part of the ADAS system as discussed herein. By way of example, the safety system 200 may include (e.g., as part of the driving policy) a computer implementation of a formal model such as a safety driving model. A safety driving model may include an implementation of a mathematical model formalizing an interpretation of applicable laws, standards, policies, etc. that are applicable to self-driving (e.g., ground) vehicles. In some embodiments, the SDM may comprise a standardized driving policy such as the Responsibility Sensitivity Safety (RSS) model as discussed herein. However, the embodiments are not limited to this particular example, and the SDM may be implemented using any suitable driving policy model that defines various safety parameters that the AV should comply with to facilitate safe driving.

For instance, the SDM may be designed to achieve, e.g., three goals: first, the interpretation of the law should be sound in the sense that it complies with how humans interpret the law; second, the interpretation should lead to a useful driving policy, meaning it will lead to an agile driving policy rather than an overly-defensive driving which inevitably would confuse other human drivers and will block traffic, and in turn limit the scalability of system deployment; and third, the interpretation should be efficiently verifiable in the sense that it can be rigorously proven that the self-driving (autonomous) vehicle correctly implements the interpretation of the law. An implementation in a host vehicle of a safety driving model (e.g. the vehicle 100) may be or include an implementation of a mathematical model for safety assurance that enables identification and performance of proper responses to dangerous situations such that self-perpetrated accidents can be avoided.

A safety driving model may implement logic to apply driving behavior rules such as the following five rules:

Do not hit someone from behind.

Do not cut-in recklessly.

Right-of-way is given, not taken.

Be careful of areas with limited visibility.

If you can avoid an accident without causing another one, you must do it.

It is to be noted that these rules are not limiting and not exclusive, and can be amended in various aspects as desired. The rules thus represent a social driving "contract" that might be different depending upon the region, and may also develop over time. While these five rules are currently applicable in most countries, the rules may not be complete or the same in each region or country and may be amended.

As described above, the vehicle 100 may include the safety system 200 as also described with reference to FIG. 2. Thus, the safety system 200 may generate data to control or assist to control the ECU of the vehicle 100 and/or other components of the vehicle 100 to directly or indirectly control the driving operation of the vehicle 100, which may include driving the vehicle 100 or other suitable operations as further discussed herein. This control may optionally include adjusting one or more SDM parameters as further discussed herein, which may occur in response to the detection of any suitable type of feedback that is obtained via image processing, sensor measurements, etc. The feedback used for this purpose may be collectively referred to herein as "environmental data measurements" and include any suitable type of data that identifies a state associated with the external environment, the vehicle occupants, the vehicle 100, and/or the cabin environment of the vehicle 100, etc.

For instance, the environmental data measurements may identify a state of a driver (e.g. drowsiness) or other passengers in the vehicle. The environmental data measurements may also include data indicative of monitored driver decisions while driving the vehicle 100, which may be particularly useful to anticipate driver mistakes and issue a warning or alert to correct or mitigate such mistakes. As another example, the environmental data measurements may identify a longitudinal and/or lateral distance between the vehicle 100 and other vehicles, the presence of objects in the road, the location of hazards, etc. The environmental data measurements may be obtained and/or be the result of an analysis of data acquired via any suitable components of the vehicle 100, such as the one or more image acquisition devices 104, the one or more sensors 105, the position sensors 106, the speed sensor 108, the one or more radar sensors 110, the one or more LIDAR sensors 112, etc.

Therefore, the ADAS may leverage or reference the SDM parameters defined by the safety driving model when performing control-based operations or non-control-based operations of the vehicle 100 in accordance with environmental data measurements, depending upon the particular scenario. The control-based operations may thus cause the vehicle 100 to comply with the SDM parameters defined by the SDM model as discussed herein. For instance, control-based operations of the vehicle 100 may include steering the vehicle 100, changing an acceleration and/or velocity of the vehicle 100, etc. Examples of non-control-based operations include causing the one or more user interfaces 206 to issue relevant alerts or warnings, changing a vehicle setting, etc.

Thus, the safety parameters of the SDM may be modified while the AV is driving in response to various environmental data measurements. However, the embodiments as discussed herein additionally or alternatively include the modification of the SDM safety parameters in the developmental stage, i.e. when the SDM is initially deployed as part of the control system of the vehicle 100. For example, and as further discussed below, the safety parameters of the SDM may be adapted in response to whether the vehicle-level failure rate of the vehicle 100 is less than a predetermined threshold. To provide an illustrative example, the vehicle 100 may be identified as initially failing certification by not meeting the threshold MTBF set by a standards authority. Thus, during the developmental phase, the safety parameters of the vehicle 100 may be modified to represent a more "conservative" driving policy (e.g. the minimum safe longitudinal and/or lateral following distances). Once this change has been made, the vehicle 100 may be re-tested until the vehicle 100 meets this failure rate threshold requirement. Additional examples of such safety parameters, any of which may be adjusted during development and/or during driving as noted above, are provide in further detail below.

Examples of Safety Parameters

As further discussed herein, Autonomous Vehicles (AVs) use one or more safety driving models that define safety parameters in accordance with various rules, such as the five driving rules as noted above, for instance. Again, the defined safety parameters allow AVs to enforce these driving rules by measuring the environment via various sensors, AV systems, image analysis, object detection and classification, etc., and then calculating the appropriate safety parameters using this information. For example, two safety parameters that are used in accordance with the aspects as described herein include the longitudinal and lateral distances between vehicles, represented as $d^{long}$ and $d^{lat}$, respectively. These longitudinal and lateral distances are a function of each vehicle's velocity (e.g. a rear (enforcing) vehicle ($v_{rear}$) and a front vehicle ($v_{front}$)), each vehicle's possible longitudinal maximum acceleration $$\left(a_{max,accel}^{long}\right)$$

and lateral maximum acceleration $$\left(a_{max,accel}^{lat}\right),$$

each vehicle's possible longitudinal minimum deceleration $$\left(a_{min,brake}^{long}\right)$$

and possible lateral minimum deceleration $$\left(a_{min,brake}^{lat}\right),$$

each vehicle's possible longitudinal maximum deceleration $$\left(a_{max,brake}^{long}\right)$$

and lateral maximum deceleration $$\left(a_{max,brake}^{lat}\right),$$

and response times of the vehicles ($\rho$). The minimum safe longitudinal distance $$d_{min}^{long})$$

and the minimum safe lateral distance $$\left(d_{min}^{lat}\right)$$

13 are defined below in accordance with Equations A and B, respectively.

$$d_{min}^{long} =$$

$$\left[ v_{rear}\ \rho + \frac{1}{2} a_{max,accel}^{long}\ \rho^2 + \frac{\left(v_{rear} + \rho\ a_{max,accel}^{long}\right)^2}{2 a_{min,brake}^{long}} - \frac{v_{front}^2}{2 a_{max,brake}^{long}} \right],$$

$$\text{Eqn. A}$$

where the longitudinal minimum safe distance $$d_{min}^{long}$$

applies to rear and front cars driving in the same direction; and $$d_{min}^{lat} = \mu + \left[ \frac{2\ v_1 + \rho\ a_{max,accel}^{lat}}{2}\rho + \frac{\left(v_1 + \rho\ a_{max,accel}^{lat}\right)^2}{2\ a_{min,brake}^{lat}} - \left( \frac{2 v_2 - \rho\ a_{max,accel}^{lat}}{2}\rho - \frac{\left(v_2 - \rho\ a_{max,accel}^{lat}\right)^2}{2\ a_{min,brake}^{lat}} \right) \right],$$

$$\text{Eqn. B}$$

where the lateral minimum safe distance $$d_{min}^{lat}$$

applies with notations associated with a car₁ to the left of a car₂, and where μ represents a safe lateral distance measurement, which may be calculated in accordance with any known manner The SDM parameters (i.e. safety parameters) shown above are provided by way of example and not limitation, and may include any suitable type of parameters that define safe operation of the vehicle 100, and which may or may not be adjusted in various scenarios and/or based upon the results of a vehicle-level failure rate computation. For instance, the SDM parameters may include maximum and/or minimum velocity, maximum and/or minimum acceleration, maximum braking force to be applied, the manner in which braking is to be applied, the speed at which the vehicle 100 should execute turns and other maneuvers, etc. The SDM parameters may additionally or alternatively depend on the type of the vehicle 100, the loading of the vehicle 100, age or mechanical conditions of the vehicle 100, environmental conditions, choice of driving style (i.e., more assertive or more conservative), etc.

Thus, the SDM parameters may be preset (e.g. predetermined) or computed based on preset criteria or profiles, such that they represent a common or approved hypothetical model vehicle or vehicles. In other embodiments, the SDM parameters (or at least an SDM parameter or some SDM parameters from a plurality of SDM parameters) are set or adjusted according to information that is specific to a particular vehicle. For example an SDM parameter can be adjusted based on any suitable number and/or type of metrics and/or measurements, such as the tire pressure of the vehicle, the load of the vehicle, the weight distribution of the vehicle, a measured friction coefficient of road under the vehicle, a smoothness measure of the road ahead of the vehicle, a curvature of the road ahead of the vehicle, a state of alertness of an operator (e.g. a driver) of the vehicle, etc.

MTBF Model Application

Again, there is a strong need for comprehensive Mean Time between Failure (MTBF) models for AVs. The embodiments discussed in further detail herein introduce a generic and scalable MTBF model that creates a link between errors in the AV perception system and the vehicle-level failures (e.g. collisions). Using the MTBF model, requirements may be derived for the perception quality based on a desired vehicle-level MTBF, or vice versa, to obtain an MTBF value given a certain mission profile and perception quality. This MBTF may be particularly useful to obtain the appropriate certification with a local jurisdiction and/or standards authority, which typically require threshold MTBF requirements be met or exceeded. Moreover, and as further discussed herein, the MTBF computation may provide a high level of granularity with respect to specific types of perception errors, the conditions identified with such errors, as well as the resulting vehicle-level failures. This data may be used as part of the AV development process to ensure that the resulting deployed system meets the aforementioned regulatory requirements.

One challenge with respect to the ongoing development of AVs is safety assurance and validation. To address these challenges, standards exist that define safety parameters, and compliance with such safety standards ensures certification of the particular AV. For instance, one such standard includes the International Organization for Standardization (ISO) 26262 Standard, entitled "Road vehicles—Functional safety," which is an international standard for functional safety of electrical and/or electronic systems that are installed in serial production road vehicles (excluding mopeds), defined in 2011, and revised in 2018. Another example includes the Safety of the Intended Functionality (SOTIF (ISO 21448)) standard. Compliance with one or more such authorities is typically required to receive authority certification for public use.

Consequently, adequate safety goals need to be defined throughout the AV development cycle and appropriate validation and verification mechanisms have to be installed. One important safety goal to achieve trust in AV systems is that AVs drive "safer" than human drivers. For example, the German Federal Ministry of Transport and Digital Infrastructure states that "the licensing of automated systems is not justifiable unless it promises to produce at least a diminution in harm compared with human driving." In this regard, a typical goal for AV performance is to be 10 to 100 times better than a human driver, who has on average for every 105 hours a severe accident. Hence, the corresponding AV safety goal represents a Mean Time Between Failure (MTBF) of 10⁶ or 10⁷ hours (or better), where vehicle-level failures are defined as collisions caused by the AV.

At the same time, a complex system such as an AV, which operates in a highly dynamic environment, can fail due to many reasons. For example, and as discussed in further detail below, AV planning errors can maneuver the AV into a dangerous situation, or perception errors can result in undetected objects. Fortunately, errors in planning components can be mitigated with safety frameworks such as the "Responsibility Sensitive Safety" (RSS) model, which can ensure safe operation of the AV if the perception is error-free. On the other hand, comprehensive safety solutions for the AV perception systems have not been addressed. And to make matters worse, even the best perception systems have inherent weaknesses and limitations, which can cause undetected objects even in the close vicinity of the AV. If such a perception error appears in a critical traffic situation (e.g. a non-detected standing object in front of the AV), a hazardous event (i.e. a collision) can be the consequence.

Figure 3:
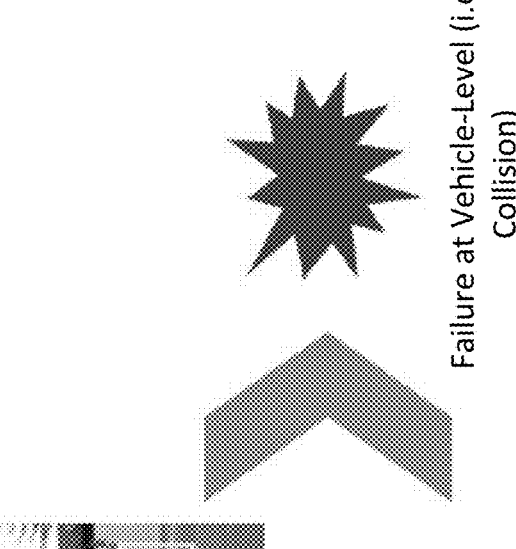
FIG. 3 illustrates a mission profile that shows a correlation between an AV being in a potentially relevant traffic situation and a vehicle-level failure due to perception error, in accordance with one or more aspects of the present disclosure.
Figure 3:
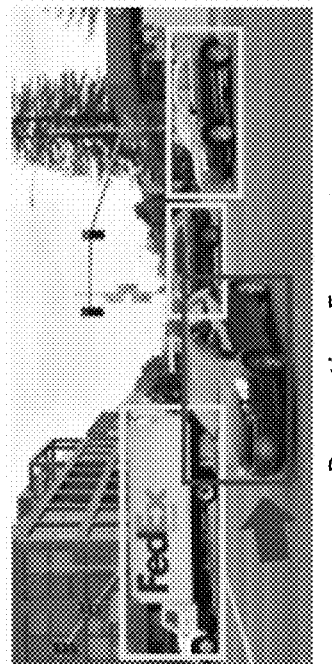
Figure 3:
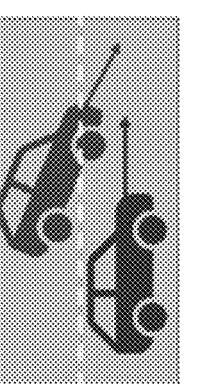
Figure 3:
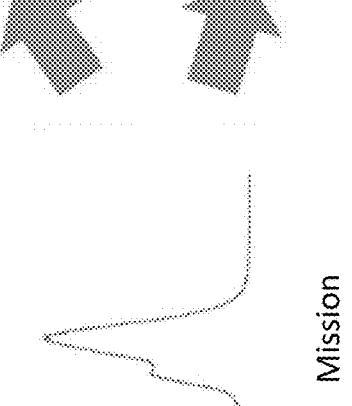

Hence, to ensure that the AV safety goals can be achieved in the field, the embodiments as described herein function to comprehensively model the relationship between a perception error rate and a resulting vehicle-level failure rate while considering masking factors due to other components or the current traffic situation. In other words, the embodiments as described herein recognize that perception errors can only cause vehicle-level failures (e.g. collisions) in critical driving situations, and the rates of both perception errors and vehicle-level failures depend on the particular driving type, which may include the road type, environment, and/or other suitable conditions in which the AV is operating, which is referred to herein as a vehicle "mission profile." Each mission profile may thus represent any suitable combination of relevant parameters that define specific driving conditions such as a range of speed, road characteristics (e.g. highway driving versus rural or city roads), traffic density, time of day, weather conditions (e.g. driving in the rain, snow, fog, etc.), etc. The embodiments described in further detail herein leverage the subdivision amongst the different recognized mission profiles to provide an approach to link vehicle-level failure rates to perception error rates. In doing so, this approach considers not only perception errors, but also the likelihoods of an AV being in a potentially relevant traffic situation and the various masking effects given a certain mission profile, as shown in FIG. 3. This enables a vehicle-level failure rate and corresponding MTBF estimation to be derived given mission profiles and perception error rates, which can be obtained from manufacturer or public databases, as discussed in further detail below.

Additionally, the embodiments as discussed herein enable the derivation of requirements for perception quality based on a desired vehicle-level MTBF. For instance, experimental results based on naturalistic driving data collected on German highways show that a perception error rate below $10^{-5}$ is required to achieve the desired safety goal of an MTBF of $10^6$ hours (or more).

Perceive, Plan, and Act AV Pipeline

Figure 4:
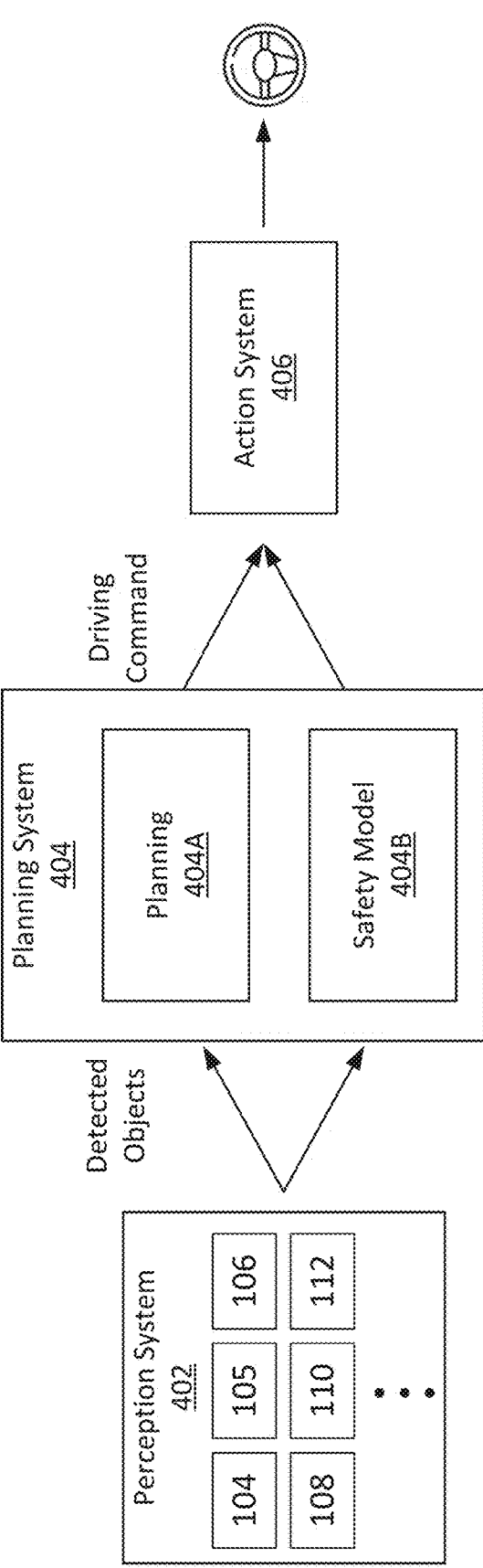
FIG. 4 illustrates an example perceive, plan, act pipeline used by AVs, in accordance with one or more aspects of the present disclosure.

Most AVs operate based on the same common principle: Perceive, Plan, Act. As shown in FIG. 4, any suitable number AV sensors may be represented by an overall "perception" system 402, which functions to capture the environment to create a digital representation, the so-called environment model. In some examples, the environmental model can be constructed and updated also based on AV map information, such as REM or Roadbook information as described herein. Using the vehicle 100 as an example, the perception system 402 may include one or more sensors such as the image acquisition devices 104, one or more sensors 105, one or more position sensors 106, one or more speed sensors 108, one or more radar sensors 110, one or more LIDAR sensors 112, etc. The perception system 402 is not limited to any specific set or type of sensors, and may be represented as any suitable number and/or type of AV sensors that are used to capture information about the environment, the process of which being prone to perception errors.

In any event, the environment model that is generated via the sensor data acquired via the perception system 402 is then implemented via the "planning" system 404, which comprises the planning components 404A and 404B, to identify the next set of actions and behaviors. The planning components 404A, 404B may constitute part of the one or more processors 102 as discussed above, which may form a controller that is configured to compute the various control-related functions of the vehicle 100. In this context, the control-related functions may represent the calculation of specific driving commands such as a vehicle following speed, velocity, acceleration, braking, steering, trajectory, etc., in response to the environmental model that is constructed using the sensor data received via the perception system 402.

The calculated control-related functions are then executed via the "action" or execution system 406. The action system 406 may thus represent, for instance, part of the one or more processors 102 as discussed above, which may form a controller that is also configured to execute the driving commands for the vehicle 100. This may include the translation of the specific control-related functions to the transmission of the control signals that effectuate the desired execution of a control-related function. Therefore, in terms of safety assurance, the action system 406 typically implements hardware redundancy to ensure the proper execution of the planned driving commands. In addition, safety approaches for these components are well established, and manufacturers as well as certification authorities understand the necessities.

However, the situation is different with respect to the perception system 402 and the planning system 404. In this case, to ensure safety of an AV planning system, a safety driving model (SDM) may be implemented, as discussed above. As one illustrative scenario, the RSS approach has been adopted as one type of SDM, which has contributed to the upcoming IEEE 2846 standard, entitled "Assumptions for Models in Safety-Related Automated Vehicle Behavior." Such industry standards focus on identifying similar and adequate (SOTIF) solutions on perception systems, which allow the influence of perception errors on vehicle-level failures to be captured, and by this means prove that the perception system is sufficiently safe.

But although effort is spent on improving the overall perception quality, and thus reducing error rates, the inherent limitations of perception systems are not yet solved. Therefore, still false alarms (the detection of non-existing objects) or detection misses (non-detection of an existing object) may occur. These errors then propagate through the rest of the pipeline, and may result in a wrong or inadequate driving decision (i.e. driving command) being generated via the planning components 404A. 404B, which is then improperly executed via the action system 406. Subsequently, the vehicle may be forced by the planning system 404 (e.g. via the constraints imposed by the safety model component 404B) to perform an emergency stop in the case of a false alarm that is detected via the perception system 402. That is, the planning components 404A. 404B assume an unsafe state although the actual state is safe. As another example, the planning components 404A, 404B may not decelerate properly in the case of a detection miss (i.e. the planning components 404A. 404B assume a safe state although the actual state is unsafe.

However, despite its importance, the relation among perception errors and vehicle collisions has not been sufficiently studied, and a generic and scalable model has not been proposed. Thus, the embodiments as described herein function to address these issues and close this gap by presenting techniques by which to generate a generic and scalable model, which captures the impact of perception errors together with the mission profile and the related traffic situations on the overall vehicle-level failure rate.

Vehicle-Level Failure Rate Estimation

This Section describes an overall approach to link perception errors to vehicle-level failures. e.g. collisions caused by the AV. To do so, it is first necessary to understand which perception errors may cause collisions and under which environmental circumstances (i.e. traffic situations) this may occur (see FIG. 3). Therefore, a set of definitions is first provided, which are then leveraged to derive the MTBF model as discussed in further detail below.

Safety Relevant and Severe Perception Errors

Again, perception errors can occur even in the best perception systems due to inherent limitations, which may then lead to an unsafe vehicle behavior. In this regard, it is important to differentiate between the different types of perception errors that may occur. First, there are perception misses, also called false negative errors, in which case an object is not detected. The opposite case is possible as well, i.e. where the perception system 402 reports a non-existing object, also referred to as a false positive error or false alarm. Second, the perception system 402 may provide the wrong distance or velocity values, which results in either an object that is in reality closer or slower than perceived, or that is further away or faster than reported. As the impact on vehicle-level safety of the first type of velocity or distance errors is similar to perception misses (i.e. in both cases the system perceives a situation as safe, which might be unsafe), both are classified as "Type II errors" (i.e. the rejection of an actually true null hypothesis). False positive errors and the other velocity and distance errors are classified as "Type I errors" (i.e. the acceptance of an actually false null hypothesis). In other words, for Type I errors, an actually safe situation may be perceived as unsafe. As a result, Type I errors can cause for instance unwanted braking maneuvers, while Type II errors can lead to a vehicle not braking although it should.

Definition 1: Type I and Type II Perception Errors.

With this in mind, a perception error is classified as a Type I or Type II perception error as follows:

Type I: The perceived object information is more severe than it is in reality.

Type II: The perceived object information is less severe than it is in reality.

It is important to note that not every perception error affects the safety judgment of the AV planning system 404. For example, a false alarm on a neighboring lane not within the path of the AV may not trigger a vehicle action. In fact, only a subset of errors or a combination of errors are truly relevant, which include those that can change the safety judgment of the planning system 404 (e.g. not sufficient braking or unnecessary braking). Therefore, the following definition is provided with respect to safety-relevant perception errors:

Definition 2: Safety-Relevant Perception Error.

A perception error is classified as safety-relevant if and only if it changes the safety decision of the AV planning system 404 by:

(1) Causing an unnecessary emergency maneuver (e.g. strong deceleration): or (2) Results in the AV 100 not performing the required emergency maneuver (e.g. insufficient braking).

It is noted that case (1) can only happen for Type I errors, while Type II errors are linked to case (2).

Figure 5:
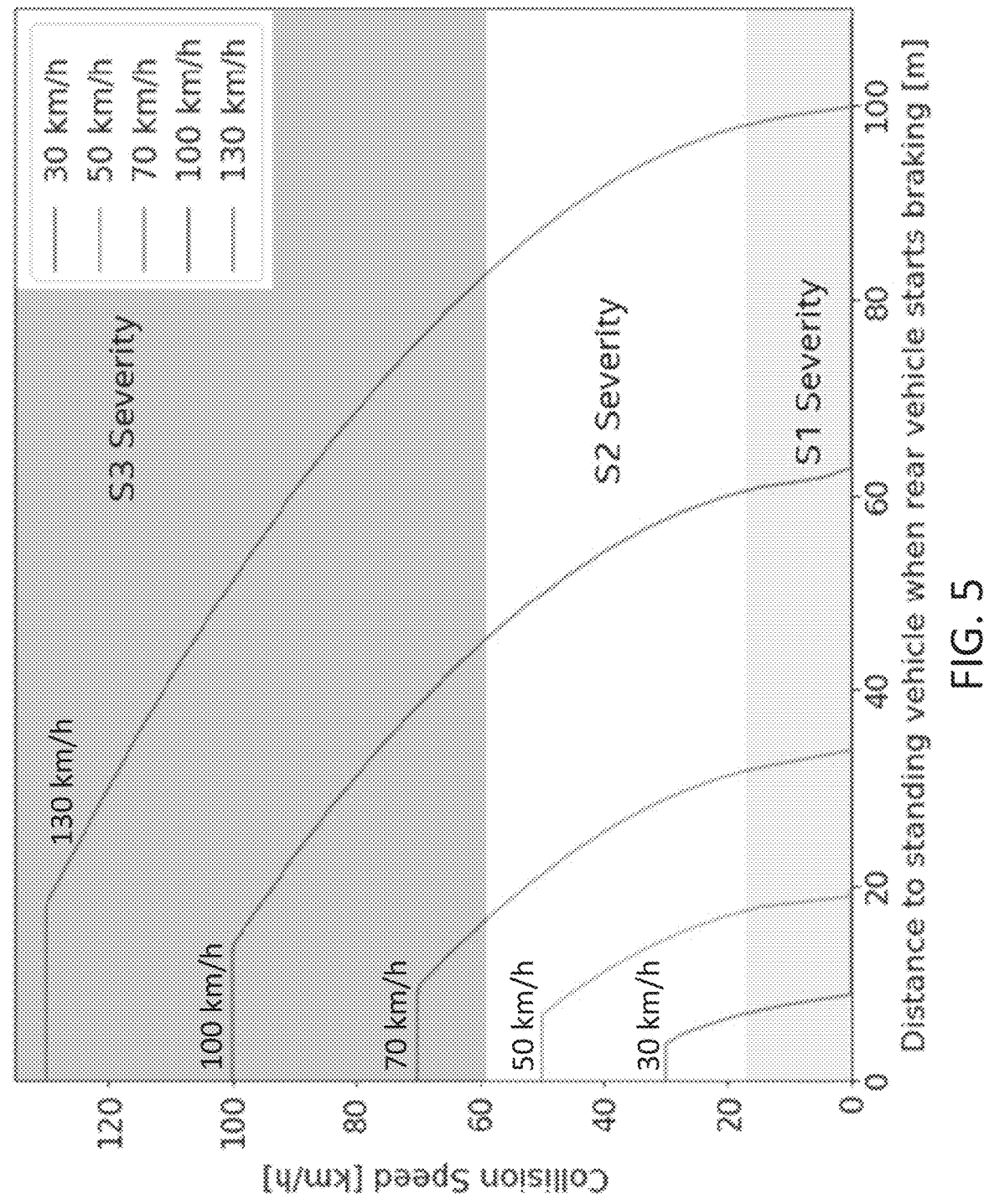
FIG. 5 illustrates an example of different severity classes based on collision speed, in accordance with one or more aspects of the present disclosure.

By changing the safety decision of the planning system 400, the results of a perception error at the vehicle-level may be a collision with another object. However, as not every collision is equally severe, the errors are further differentiated based on their potential result at the vehicle-level. For instance, some errors may only cause material damage, while other errors may result in severe harm to humans. In this regard, the ISO 26262 Standard as noted above defines four classes of severity: S0-S3. These classes include severity levels ranging between injuries up to fatal events. FIG. 5 illustrates an example of different severity classes based on collision speed. Thus, the embodiments as described herein further differentiate safety-relevant perception errors among severe and non-severe errors. As shown in FIG. 5, the rear-end collision severity depends upon vehicle speed and distance for a car-following situation (i.e. the front vehicle stands still, the rear vehicle decelerates with 8 m/s$^2$ after a 0.5 s reaction time.

Definition 3: Severe Perception Error.

In this context, a perception error is severe if and only if it is a safety-relevant perception error that can cause a collision with a S2 or S3 severity according to the ISO 26262 Standard. It is noted that this definition is used by way of example and for ease of explanation, and the embodiments as discussed in further detail herein may implement any suitable type of severity classification system to identify severe safety-relevant perception errors. For example, a perception error may alternatively be considered severe if and only if it is a safety-relevant perception error that can cause a collision with errors causing a severity with a S1, S2, and/or S3 severity according to the ISO 26262 Standard.

Thus, in addition to the perception error being safety-relevant, it is also required that a potentially dangerous traffic situation occurs to cause a collision (see FIG. 3). For example, a perception miss of a leading vehicle may not have any consequences if the leading vehicle is faster than the AV. For this reason, the embodiments as described herein use the following example definition for potentially dangerous situations:

Definition 4: Potentially Dangerous Traffic Situation.

A traffic situation is potentially dangerous if and only if a perception error (Type I or Type II) will cause a collision.

Figure 6:
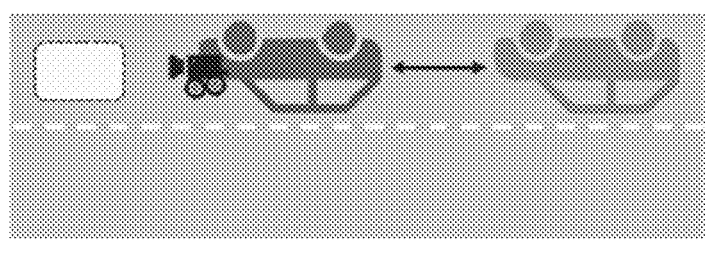
FIG. 6 illustrates an example in which the type of traffic situation is correlated to the perception error class, in accordance with one or more aspects of the present disclosure.
Figure 6:
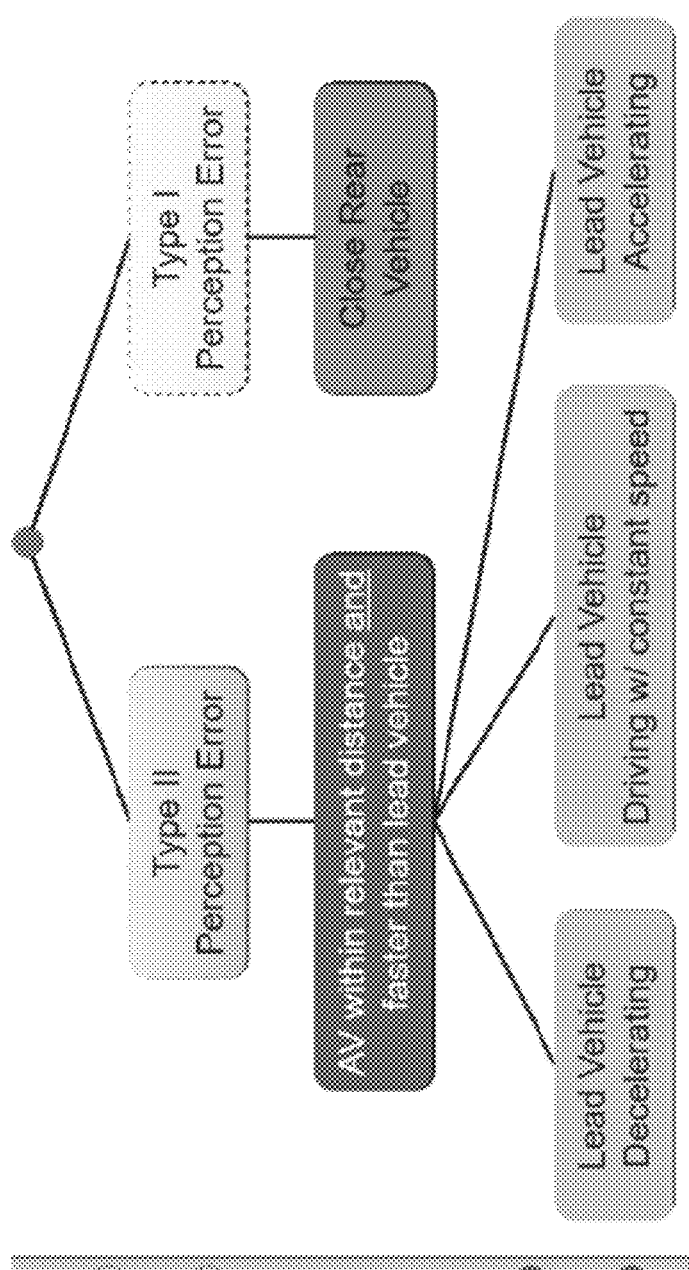

An intuitive example for a potentially dangerous traffic situation for a Type I perception error is for a vehicle that follows the AV very closely, and thus cannot react to an unexpected braking maneuver of the AV caused by a false alarm of the AV's perception system. For Type II errors, an example is an AV approaching an undetected standing vehicle, where the AV does not decelerate appropriately due to a detection miss. As shown by these examples, the type of traffic situation is relevant and is thus correlated to the perception error class. For the case of a lane-following situation (e.g. on a highway), FIG. 6 depicts this in more detail, which illustrates the relation of potentially dangerous driving situations and Type I/II perception errors for a lane following scenario.

Statistical Model

As discussed above, a collision (i.e. a vehicle-level failure) results from the combination of a perception error and a potentially dangerous traffic situation (see FIG. 3). Both events can be considered independently of one another, which means that a vehicle-level failure rate $\lambda$ can be estimated by multiplying the perception error rate $\lambda_p$ with the probability of being within a relevant traffic situation $p_S$. However, as there are two different types of perception errors (i.e. Type I and Type II), the overall failure rate is the sum of the products, as given in Equation (0) below as follows:

$$\lambda = \Sigma_{t \in \{1,2\}} \lambda_{P_t} \times p_{S_t} \qquad \text{Eqn. 1}$$

Having the overall failure rate λ at vehicle-level, the Mean Time Between Failure (MTBF) for the AV is thus defined as the inverse, i.e. as represented as shown in Equation (2) below as follows:

$$MTBF = \lambda^{-1} \qquad \text{Eqn. 2}$$

The variables $\lambda_p$ and $p_S$ are dependent on the mission profile, i.e. the various environmental, situational, and traffic conditions as noted above. For example, whether a vehicle is supposed to be deployed on highways or mainly in urban conditions. Moreover, the expected speed ranges play an important role as further discussed below. Hence, the embodiments as discussed herein function to extend the general model of Equation (1) to a model that further captures any suitable number of conditions related to different mission profiles, such as speed ranges for example.

Thus, using the speed ranges as an illustrative example, for a mission profile m and a speed range $i \in \{r_1, \ldots, r_n\}$, the extended model is represented as shown in Equation (3) below as follows:

$$\lambda = \Sigma_m \ \lambda_m = \Sigma_m p_m \ \Sigma_i p_i, \ m\big[\Sigma_{t \in \{1,2\}} \lambda_{p_t, m, t} \times p_{S_t, m, t}\big] \qquad \text{Eqn. 3}$$

Here, $p_m$ represents the occurrence probability of a mission profile m, and similarly $p_i$, m represents the occurrence probability of the particular speed range i (e.g. the range from 100 km/h to 130 km/h), for this particular mission profile.

Figure 7A:
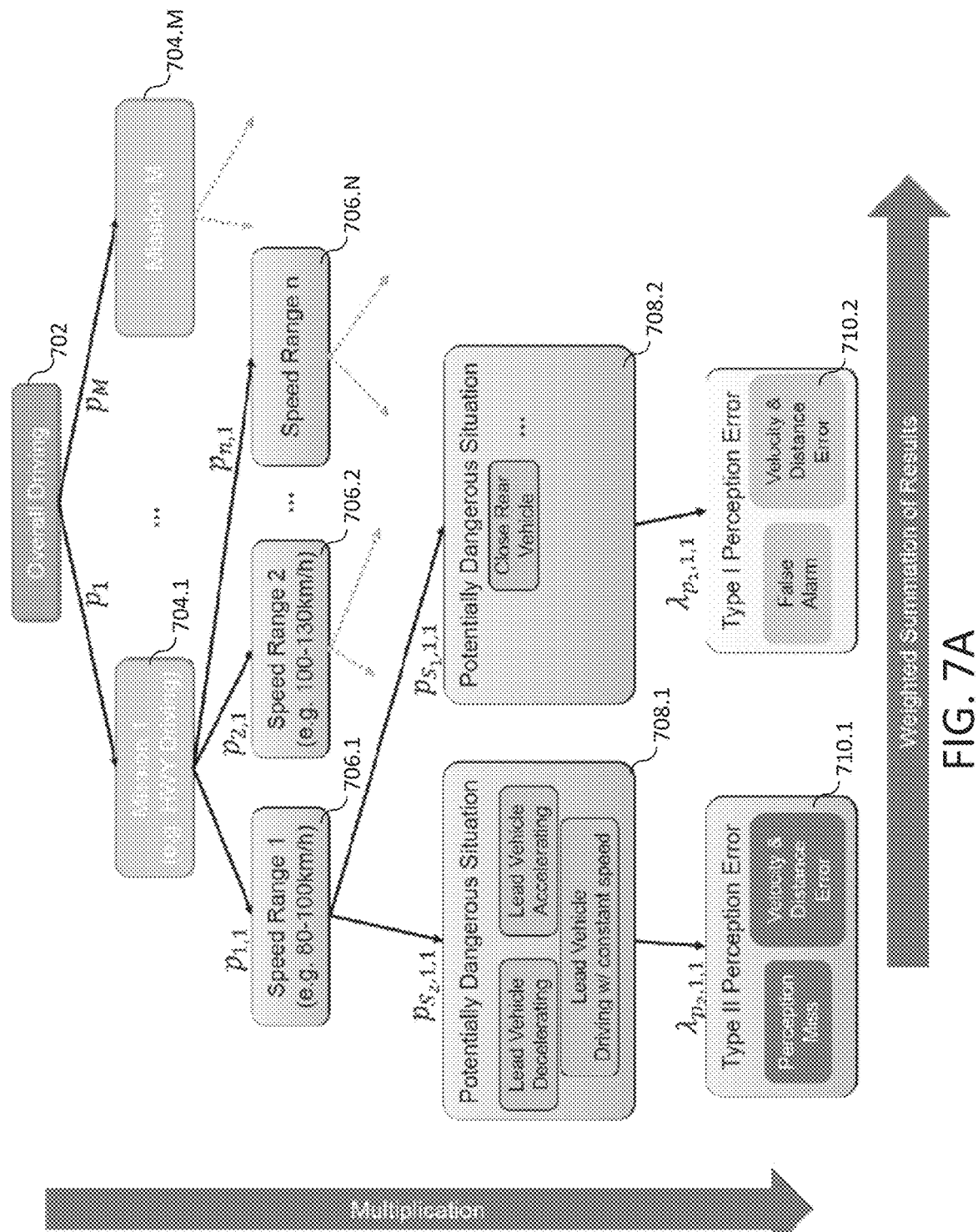
FIG. 7A illustrates an example MTBF as a probability tree, in accordance with one or more aspects of the present disclosure.

FIG. 7A illustrates an example MTBF as a probability tree. The probability tree 700 as shown in FIG. 7A represents how an MTBF model may be generated for a target AV, the MTBF model identifying vehicle-level failures based upon perception errors, as discussed above. It is noted that although the probability tree 700 illustrates perception errors as part of the vehicle MTBF calculation, this is by way of example and not limitation. For instance, the probability tree 700 may additionally or alternatively include other types of errors such as those identified with the planning system 404. In any event, the probability tree 700 includes any suitable number M of predefined mission profiles, with each mission profile 704.1-704.M representing a particular set of one or more driving conditions related to the different uses of the AV as part of an overall driving profile 702. Thus, each mission profile 704 may represent a specific time (e.g. day versus night) of driving, a specific driving type (e.g. rural, urban, etc.), a specific environmental condition (e.g. driving during specific weather conditions such as rain, snow, etc.), a specific road usage (e.g. highways, city streets, etc.). Thus, any suitable number of mission profiles may be created based upon the expected use of an AV, each corresponding to a respective set of one or more driving conditions that may be subdivided to yield any suitable level of granularity.

The probability tree 700 also defines, for each mission profile 704.1-704.M, a categorization 706.1-706.N of one or more driving metrics. Each categorization 706 of driving metrics may represent any suitable number and/or type of driving conditions that, when present in combination with the specific corresponding mission profile 704, are relevant to the probability of a perception error leading to a vehicle-level failure (e.g. a collision). For example, each of the categorizations 706.1-706.N of driving metrics as shown in FIG. 7A includes a specific predetermined speed range, although this is provided by way of example and not limitation, and the categorization 706 of driving metrics may be selected from any suitable type of metrics such that the behavior of the traffic is significantly different for each separate category. For instance, in addition to or instead of the selection of predetermined speed ranges, other metrics such as a number of lanes, weather conditions, etc., may be categorized in this manner. However, based upon the experimental results discussed in further detail below, the use of different speed ranges may be particularly useful.

Furthermore, the embodiments are not limited with respect to the number of categorizations 706 of driving metrics. For instance, if the overall amount of data is limited, there might be situations in which the use of a single overall category (e.g. N=1 for a single range of speeds) or a single mission profile (M=1) is preferred. In any event, when used, the separate categorizations 706 of driving metrics may be selected such that each category corresponds to a specific and different type of traffic behavior. Such traffic behavior may indicate, for instance, a higher frequency of braking at higher speed ranges versus lower speed ranges, a higher frequency of lane changes for roads with a greater number of lanes, etc.

Thus, and as shown in FIG. 7A, each categorization 706.1-706.N may correspond to a respective potentially dangerous traffic situation 708, as defined above with reference to Definition 4, with each potentially dangerous traffic situation 708.1, 708.2 being defined by one or more conditions that, when present, result in an occurrence of either the Type I or the Type II perception errors as defined above with reference to Definition 1. Thus, statistical information may be extracted from each of the categorizations 706.1-706.N or "buckets" of metrics regarding how likely the AV 100 is to be involved in a potentially dangerous traffic situation, which is dependent upon the various statistics for each respective categorization 706 such as how often vehicles brake, how often vehicles accelerate, typical distances between vehicles, etc.

For example, and with reference to FIG. 7A, statistical information may be extracted from the categorization 706.1 of speed ranges between 80-100 km/h to identify a probability with respect to the AV being in potentially dangerous traffic situations 708.1, which include situations in which the AV is the lead vehicle and is decelerating, when the AV is the lead vehicle and is accelerating, the lead vehicle is driving with a constant speed, etc. These types of traffic conditions are further correlated with Type II perception errors 710.1 that result in the AV perception system 402, in such situations, suffering from a perception miss, a velocity and distance error, etc. In other words, the probability of an AV having a specific Type II perception error for each potentially dangerous traffic situation 708, categorization 706 of driving metrics, and mission profile 704 may be computed from one or more available datasets, which is discussed in further detail below.

Likewise, statistical information may be extracted from the categorization 706.1 of speed ranges between 80-100 km/h to identify a probability with respect to the AV being in potentially dangerous traffic situations 708.2, which include situations defined by the AV being a close rear vehicle. These types of traffic conditions are further correlated with Type I perception errors 710.2 that result in the AV perception system 402, in such situations, suffering from a false alarm, a velocity and distance error, etc. In other words, the probability of an AV having a specific Type I perception error may also be calculated for each potentially dangerous traffic situation 708, categorization 706 of driving metrics, and mission profile 704 from one or more datasets, as discussed in further detail below.

Thus, and as shown in FIG. 7A, the vehicle-level MBTF, which is a measure of the overall vehicle failure rate due to perception error rates, may be computed by identifying that each edge of the probability tree 700 represents a conditional probability, which are multiplied in the vertical direction and added together horizontally to provide a weighted summation. In this regard, it is noted that the MTBF model 700 is scalable and generic, i.e. it does not come with any restrictions on how mission profiles 704 or categorizations 706 should be clustered. In this way, the end result of the computation performed in this manner yields a vehicle failure rate for the overall driving profile 702.

Figure 7B:
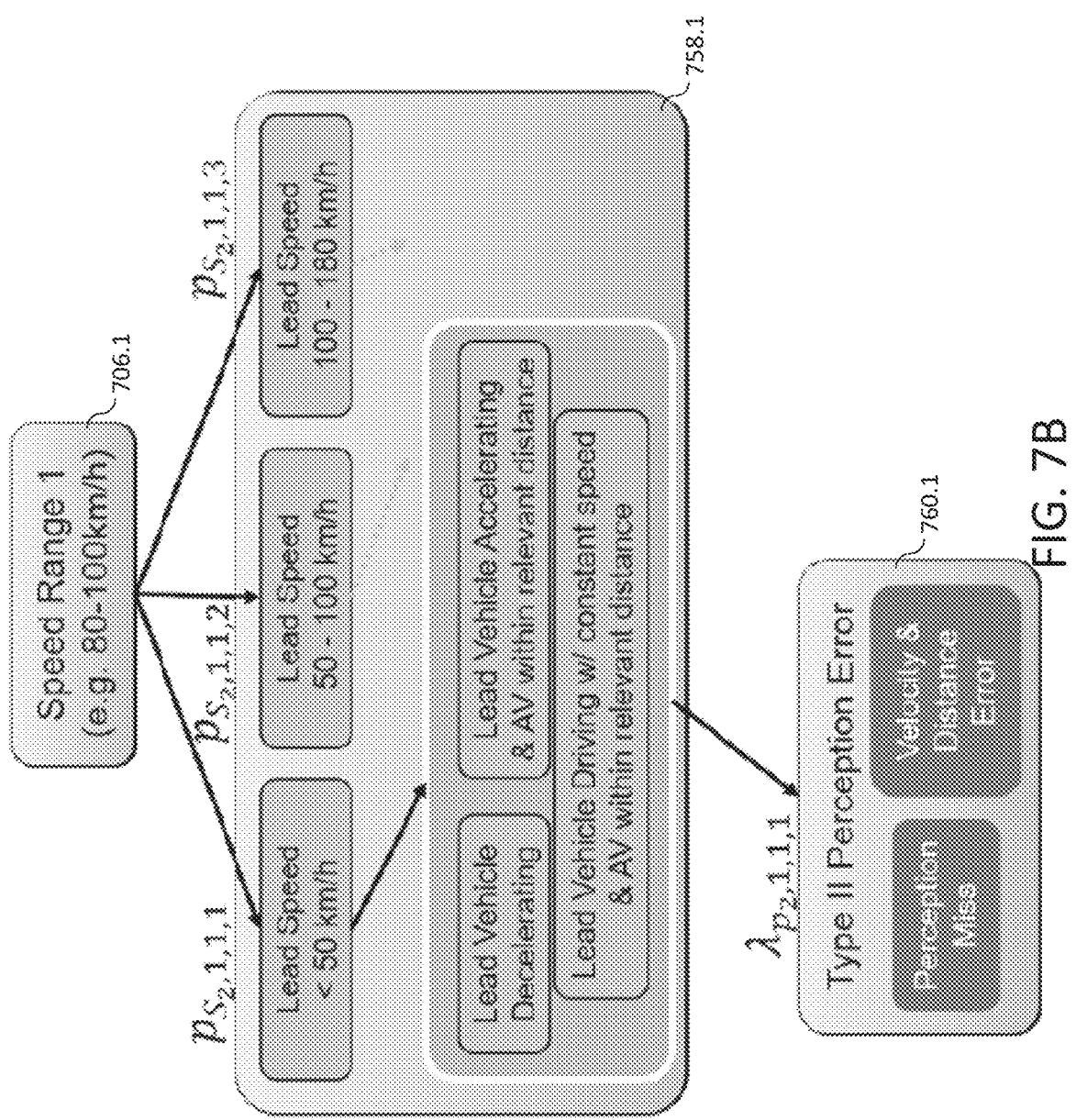
FIG. 7B illustrates an example MTBF probability tree portion indicating a further subdivision of a potentially dangerous situation, in accordance with one or more aspects of the present disclosure.

The probability tree 700 as shown in FIG. 7A is not limited to the specific arrangement as shown, and additional or alternate conditions and/or categorizations may be implemented. For example, embodiments include the potentially dangerous situations and/or the perception errors being even further subdivided. For instance, the duration of false alarms may be considered (with suitable sub-trees), or the behavior of one or more other vehicles may be further classified depending on the other vehicle's speed, as illustrated in the portion of the probability tree 750 as shown in FIG. 7B. FIG. 7B thus illustrates a model refinement to the probability tree 700 as shown in FIG. 7A to replace the potentially dangerous traffic situations 708 with a probability tree 750 that includes a potentially dangerous traffic situations 758 with separate Type II perception errors 760.1 based on the speed of the leading vehicle. The reason for this refinement is that the speed of the leading vehicle is an important influencing factor when evaluating the severity of a Type II perception error, i.e. the faster the AV and the slower the leading vehicle, the more likely a Type II perception error will become severe.

It is further noted that the model graphically illustrated in FIG. 7A may also be explained mathematically. For this, the number of perception errors $X_i$ is modeled as Poisson distribution as shown in Equation (4) below as follows:

$$X_i \sim Pois(\lambda_p) \qquad \text{Eqn. 4}$$

Modeling the driving situations as Bernoulli distribution, it follows that the number of failures can be formulated as shown in Equation (5) below as follows:

$$F_i = \sum_{k=1}^{X_i} Z_k = \sum_{k=1}^{\infty} Z_k \times 1_{k \le X_i}, \qquad \text{Eqn. 5}$$

where $Z_k \sim ber(p_S)$, and $p_S$ is the accumulated probability of being in a relevant driving situation. As $X_i$ and $Z_k$ can be assumed to be independent for every k, it follows that the expected value of $F_i$ is provided in accordance with Equation (6) below as follows:

$$E(F_i) = \qquad \text{Eqn. 6}$$
$$\sum_{k=1}^{\infty} E(Z_k) \times E(1_{k \le X_i}) = p_S \times E(X_i) = p_S \times \lambda_{X_i} = p_S \times \lambda_p = \lambda,$$

which was the starting point above as defined in Eqn. (1). It is also noted that the perception error rate $\lambda_P$ is the superposition of errors due to hardware faults (e.g. a perception miss due to a radiation-induced bit flip) and errors originating from software (e.g. perception miss due to a not-well trained AI model). Embodiments include modifying the model as desired to separate both a specific hardware failure rate and software failure rate.

Model Inputs

In accordance with various embodiments, any suitable number and/or type of input data sources may be implemented for the computation of the vehicle-level failure rate estimation model. For instance, as the model itself is generic, it can be fed with data gathered from data recordings, simulation, public datasets, or even on-the-fly while driving. However, it may be particularly useful to implement comprehensive datasets and recordings as input to generate the appropriate categorizations and statistical information to provide the various situational probabilities, i.e. the edges of the probability tree 700 as discussed above with reference to FIG. 7A. For example, the various datasets may be accessed to determine how often (i.e. the probability) that a vehicle is in a potentially dangerous traffic situation when driving at night, at a certain speed, and/or in the rain, etc. and the corresponding perception error rates for each of these sets of conditions.

Figure 8:
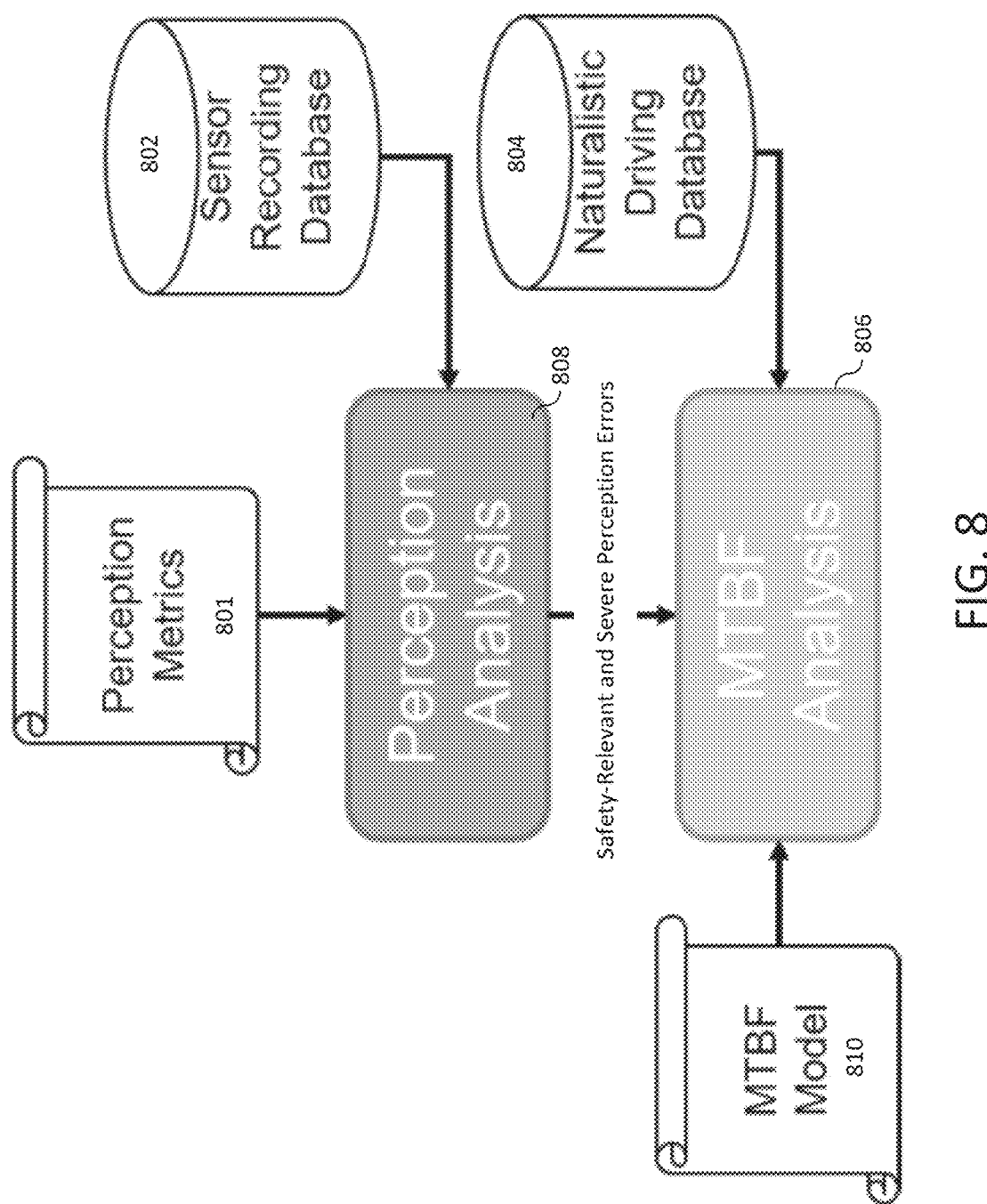
FIG. 8 illustrates example of an analysis flow using various databases as inputs to the vehicle-level failure model, in accordance with one or more aspects of the present disclosure.

An example of an analysis flow using various databases as inputs to the vehicle-level failure model is illustrated in FIG. 8. The analysis flow 800 as shown in FIG. 8 may include various stages, or blocks, which perform the functions as described herein. In some instances, which are described in further detail below, the functions performed by the respective blocks may be implemented via any suitable type of processors, processing circuitry, or other suitable components. The functionality assigned to the functional blocks of the analysis flow 800 as discussed herein is provided for ease of explanation and is non-limiting, as these functions may be shared among the functional blocks or performed by different or alternative blocks not shown in the Figures. The processing circuitry of the analysis flow 800 may be identified with any suitable type of computing device as discussed herein, or other suitable processing devices such that the functional aspects of the analysis flow 800 may be realized. Regardless of the particular implementation, the functional aspects of the analysis flow 800 may be performed via execution of machine-readable code, applications, algorithms, instructions, etc., via the processing circuitry of any suitable components of the implemented computing device. Thus, the functional aspects of the blocks as discussed herein with reference to FIG. 8 may be executed as algorithms or other suitable automated processes.

In any event, embodiments include the process flow 800 implementing two databases, with each database containing a dataset related to a specific type of statistic to enable the computation of the vehicle-level failure rate as discussed above with respect to FIGS. 7A and 7B. The use of two different databases, and the specific type of data accessed from each database, is provided by way of example and not limitation, and the embodiments as discussed herein may compute a vehicle-level failure rate using datasets from any suitable number and/or type of data sources.

For example, and with reference to FIG. 8, to obtain information regarding how often an AV perception system fails (i.e. how often errors actually occur), the perception analysis block 808 may access a sensor recording database 802. The sensor recording database 802 stores datasets related to sensor recordings (i.e. logs) that have been aggregated from a large number (e.g. hundreds, thousands, millions, etc.) of hours of AVs operating within a particular region. Such sensor recording may include, for instance, camera streams, Lidar data such as 3D point clouds, radar streams, etc. In an embodiment, the perception analysis block 808 executes any suitable type of algorithm or automatic process to perform offline testing against the relevant data accessed via the sensor recording database to identify an initial set of perception errors, and then performs an additional analysis to provide a subset of those perception errors that are classified as the Type I and Type II errors as further discussed herein.

For example, the perception metrics 801 may be obtained via execution of the perception algorithms in a particular AV for which the vehicle level failure rate is to be determined. In doing so, the perception analysis block 808 functions to compare the perception metrics obtained via similar sensor configurations stored in the sensor recording database 802 to compute an overall set of various perception errors. To provide an illustrative example, the sensor recording database 802 may contain raw sensor data, which may represent a dataset of sensor data generated by other AVs in a particular environment, and which are identified with each AV's perception system. The sensor recording database 802 may also contain an annotated list of objects that should be detected based upon then sensor dataset when one or more perception algorithms are executed via the AVs. The perception metrics 801 may represent the results of executing the perception algorithm on a target AV that is to be tested to compute a vehicle-level failure rate, as discussed herein with reference to FIGS. 7A and 7B.

The perception metrics 801 thus represent an output of the perception algorithm being executed on the target AV using the raw sensor data obtained via the sensor recording database 802. The perception metrics thus include the detected objects, distances, speeds, etc. identified via the target AV's executed perception algorithm, which are compared via the perception analysis block 808 with the annotations stored in the sensor recording database 802. The perception analysis block 808 then further analyzes the overall set of perception errors to provide a subset of these perception errors as shown in FIG. 8 that are both safety-relevant and severe. This may be identified in accordance with any suitable predetermined set of definitions, such as the Definitions 1-4 as discussed herein. Thus, the resulting safety-relevant and severe perception errors may include the various Type I and Type II errors as discussed herein, which may indicate false alarms, the miscalculation of the speed of a vehicle, the miscalculation of the distance towards another vehicle, etc., which are caused by the perception system of the target AV.

As discussed further below, the sensor recording database 802 may, in some instances, store sensor data that is less than a predetermined threshold sample size. For instance, the number of hours, vehicles, sensor data types, etc., stored in the sensor recording database 802 may be less than a predetermined threshold sample size. Thus, the embodiments as discussed herein may implement data augmentation to increase the availability of sensor data for the perception analysis block 808. The embodiments include the use of any suitable number and/or type of conditions that compare predetermined metrics to those represented in the sensor recording database 802 to identify whether data augmentation is to be used. For instance, when the number of hours, type, size, etc. of sensor data stored in the sensor recording database is less than one or more corresponding metrics (or combinations thereof), then data augmentation may be used to perform the perception analysis. Data augmentation may be implemented using a separate set of conditions, definitions, constraints, etc., which function to artificially increase the sensor data used for the perception analysis. For example, data augmentation may be performed on the existing sensor data stored in the sensor recording database 802 using a condition that assumes that all undetected objects are not moving. As another example, data augmentation may use a condition that assumes that all undetected objects are a specific type, moving less than a threshold velocity, etc.

Figure 9B:
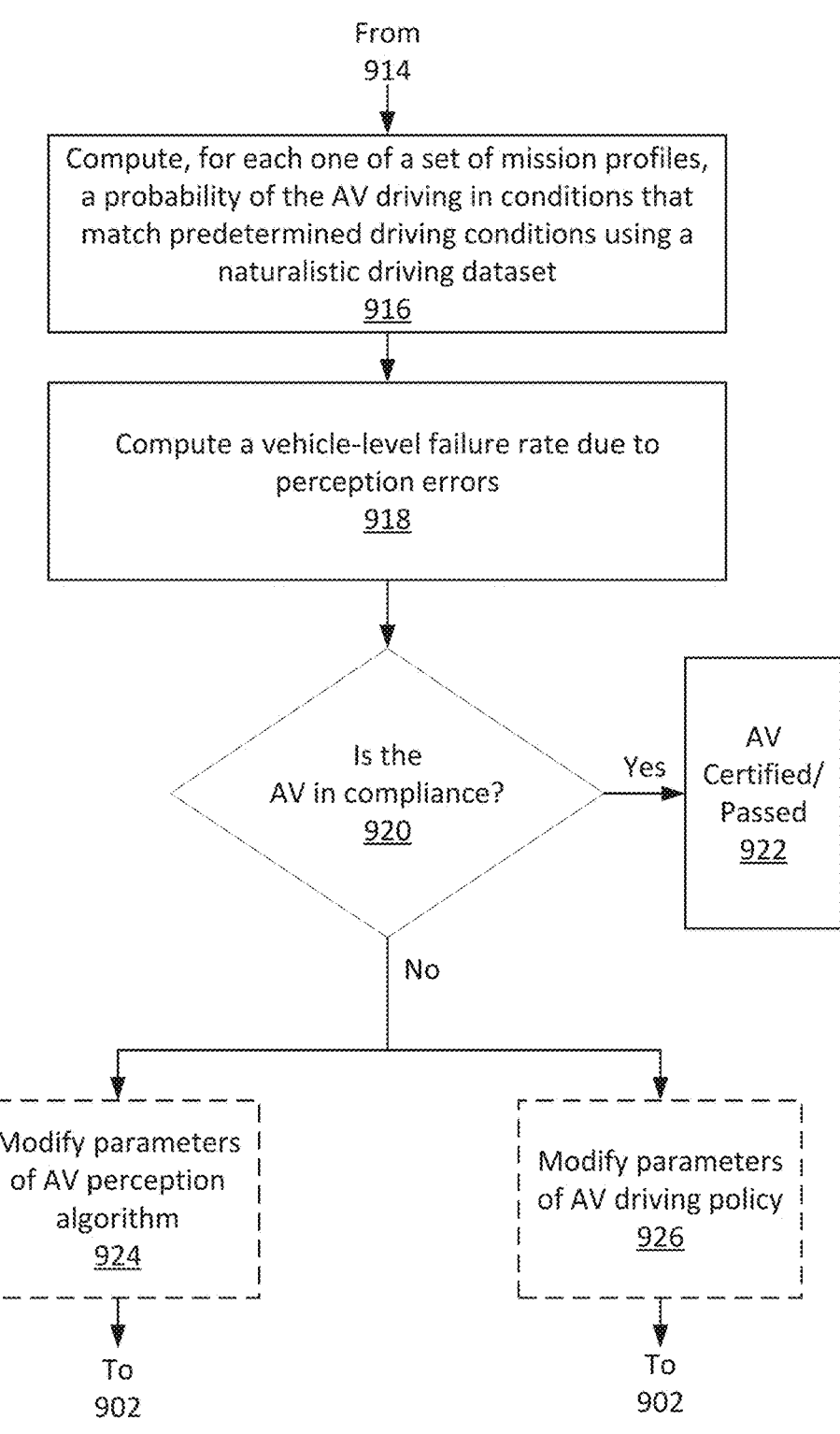

To provide further clarity, reference is now made to the process flow as shown in FIGS. 9A-9B, which may be executed via any suitable combination of the perception analysis block 808 and the MTBF analysis block 806. The process flow 900 begins via the execution (block 902) of a target AV perception algorithm against a dataset of sensor recordings to identify an overall set of perception errors. Again, this may include the execution of the target AV perception algorithm against the sensor data logs stored in the sensor recording database 802. The AV perception algorithm may constitute any suitable number and/or type of algorithms implemented by a target (i.e. tested) AV, such as the vehicle 100 for example, which again operates in accordance with a driving policy. Thus, the perception system 402 of the vehicle 100, as discussed above, may experience any suitable number of perception errors based upon the particular sensor input and corresponding tasks to be performed, such as for example detecting and/or classifying objects in a road scene, determining the distance from the vehicle 100 and other vehicles, determining the speed of the AV and/or other vehicles, and any other kinematics and kinematic relationship, etc.

The process flow 900 further includes the determination (block 904) of which the overall set of perception errors are considered safety relevant. This determination may be performed, for instance, via the perception analysis block 808 executing any suitable algorithm that filters the perception errors via a comparison of one or more metrics to one or more predetermined constraints, which may include conditions and/or definitions as discussed herein. As one example, the Definition 2 as discussed above may be used to discard perception errors that do not meet the constraints of this Definition, thus providing only safety-relevant perception errors and discarding the perception errors that are not safety-relevant. Thus, the subset of the perception errors identified at block 904 are those perception errors that may, when present, result in a change in a safety decision made by the planning system 404 of the vehicle 100.

The process flow 900 further includes the determination (block 908) of which of the subset of the safety relevant perception errors are also considered significantly severe such that, if present, could cause a collision. This may include, for example, the perception analysis block 808 executing any suitable algorithm that filters the perception errors via a comparison of one or more metrics to one or more predetermined constraints, which may include conditions and/or definitions as discussed herein. As one example, the Definition 3 as discussed above may be used to discard the safety-relevant perception errors that do not meet the constraints of this definition. i.e. only those safety-relevant perception errors (as identified in block 906) that, if present, may result in a collision with a S2 or S3 severity according to the ISO 26262 Standard.

As a result, the perception analysis block 808 generates (block 912) a subset of the overall, initial set of perception errors that meet Definitions 2 and 3 as noted above for example, i.e. are both safety-relevant and of significant severity to cause a collision. In other words, the remaining subset of the perception errors includes only those perception errors that are safety relevant in that, if present, would toggle a decision made by the planning system 404 of the AV to potentially cause a collision of a significant severity. That is, the perception analysis block 808 functions to filter the initial set of overall perception error results to only those relevant to the determination of a vehicle-level failure rate, as discussed herein.

Thus, as one example, the subset of the perception errors output via the perception analysis block 808 (block 912) may include the Type I and Type II errors as discussed above, i.e. those that meet Definition 1 above for these types of perception errors. The process flow 900 thus further includes correlating (block 914) the subset of the perception errors (e.g. the Type I and Type II errors) to a set of respective predetermined driving conditions. This may include, for instance, correlating each Type I and Type II error to the various subdivided conditions or "buckets" within each mission profile, as discussed above with reference to FIGS. 7A-7B. As an illustrative example, this may include allocating each Type I and Type II error to the specific combination of driving conditions identified with the mission profile 704.1, the speed range 706.1, and the potentially dangerous traffic situations 708.1, 708.2. Thus, the combination of the mission profile 704.1 and the various categorizations beneath the mission profile 704.1 such as e.g. the speed range and the potentially dangerous situations identified with that particular speed range may be considered a set of driving conditions in this example. This process may then be repeated such that each Type I and Type II error (from the subset of perception errors) is correlated to a respective set of driving conditions, thereby completing the mapping of the Type I and Type II errors within the MTBF probability tree 700. This enables the computation of the perception error rates λ for both the Type I and Type II perception errors identified with each potentially dangerous situation 708 for each categorization 706 (e.g. the speed range, etc.) for each mission profile 704.

To provide a mathematical example, to obtain the perception error rates, the Definitions 1 to 4 are converted to quantifiable performance indicators, which are then obtained by testing the perception system against simulation, data recordings, or directly on the road. As an illustrative example, Type II perception errors are referenced, although for Type I errors the results are similar. Thus, as specified in Definition 2, a relevant perception error will flip the safety consideration of the AV planning system. Assuming that this system acts according a SDM such as the RSS Standard, the number of relevant perception Type II errors for car-following situations can be obtained in accordance with Equation 7 below as follows:

$$\Sigma_e 1_{d_{per}>d_{RSS}>d_{real}}, \qquad \text{Eqn. 7}$$

where e represents all evaluated events (e.g. clips, frames, etc.), and $1_{d_{per}<d_{RSS}<d_{real}}$ is 1 if $d_{per}>d_{RSS}>d_{real}$, else 0. In this regard, $d_{per}$ represents the perceived distance between the AV and the leading vehicle, $d_{RSS}$ represents the required safety distance according to the RSS (in this example, which could be any suitable SDM), and $d_{real}$ represents the distance in reality. In other words, the perception error forces the system to judge the system as safe ($d_{per}>d_{RSS}$), while in reality it is unsafe ($d_{real}<d_{RSS}$). In case an object is not detected at all, one may assume that $d_{per}=\infty$.

Referring now back to FIG. 8, once the Type I and Type II perception errors are computed in this manner, the MTBF analysis block 806 functions to compute the situational probabilities of the AV, i.e. the probability edges p of the MTBF probability tree 700 as discussed above with respect to FIGS. 7A-7B. In an embodiment, the MTBF analysis block 806 parses data from the naturalistic driving database 802 to obtain the appropriate situational probabilities for an AV for each relevant mission profile. Thus, the MTBF analysis block 806 may execute any suitable algorithm or automated process to compute the situational probabilities of the target AV driving (e.g. the vehicle 100), for each respective mission profile, in accordance with specific conditions (e.g. speed ranges, being in a potentially dangerous traffic situation, etc.). This may be the result of the MTBF analysis block 806 analyzing the data contained in the naturalistic driving database 802, which may include any suitable type of naturalistic driving datasets such as, for example, a publicly available driving database for one or more applicable regions that indicates driving behavior of a large sample of vehicles in various conditions along with annotations, labels, descriptors, etc. As illustrative examples, this may include the HighD dataset, which is a dataset of naturalistic vehicle trajectories recorded on German highways, the National Highway Traffic Safety Administration (NHTSA), etc.

It is noted that in the example described with respect to the process flow 900 that the subset of the perception errors are generated (block 912) are safety-relevant and severe, in accordance with the Type I and Type II perception error definitions noted herein. However, this is by way of example and not limitation, and any suitable number of rules, constraints, conditions, etc. may be applied in addition to or instead of those performed in blocks 904 and 908 to provide the subset of perception errors. To provide an illustrative example, the subset of safety-relevant and severe perception errors may be provided by filtering the perception errors according to a collision that is caused by and/or is the fault of the host vehicle. In this context, "fault" may be defined in accordance with any suitable predefined set of rules, such as e.g. a formal safety model such as RSS, the SDM as discussed herein, etc.

Referring now to FIG. 9B, the process flow 900 may include the computation (block 916) of the situation probabilities, which again may constitute the edges p of the MTBF tree 700 as discussed herein with reference to FIGS. 7A-7B. These situational probabilities may be computed via the MTBF analysis block 806 executing any suitable algorithm or automated process. The situational probabilities may include, for instance, the identification of the various mission profiles 704.1-704.M as discussed above. Then, for each mission profile 704.1-704.M, a situational probability p may be computed using the data accessed via the naturalistic driving database 802. Each situational probability may be computed in accordance with a probability of a target AV being driven in conditions that match predetermined driving conditions with respect to each mission profile 704, and each predetermined set of conditions associated with that mission profile (i.e. the various subdivisions beneath each mission profile), as described herein.

For instance, the set of predetermined driving conditions may include a combination of the conditions identified with each mission profile, which includes each categorization 706 (e.g. speed ranges), the potentially dangerous traffic situations 708 for each categorization 706, and the set of conditions that define each potentially dangerous traffic situation as discussed above with reference to FIGS. 7A and 7B. For example, the MTBF analysis block 806 may compute (block 916) the various categorizations and their respective situational probabilities based upon an analysis of speed distribution, braking behavior, acceleration behavior, etc., for datasets stored in the naturalistic driving database 804 corresponding to the metrics defined in each of the various mission profiles 704.1-704.M. Again, any suitable number of predetermined driving conditions may be used as part of the computation of the situational probabilities, such that the computed situational probabilities may represent any suitable level of granularity with respect to various driving conditions as noted herein. As an illustrative example, previous analyses of naturalistic driving data for highways have found that the probability of being in a situation relevant for Type II perception errors is around 45%. The HighD dataset was also used for an experimental study to provide additional clarity in this regard, as presented in further detail below.

Once the various situational probabilities are computed in this manner, the process flow 900 further includes the computation (block 918) of the vehicle-level failure rate of the target AV due to the perception errors, which is based upon the based upon the set of situational probabilities p and the perception error rate A per each respective set of predetermined driving conditions. In other words, the vehicle-level failure rate is computed based upon a combination of the set of situational probabilities that are computed for each respective set of predetermined driving conditions, multiplied by the perception error rate for that same set of predetermined driving conditions. This computation may include, for instance, the multiplication of the computed situational probabilities for each mission profile 704.1-704.M by the perception error rate A in the vertical direction, and a weighted summation of the results in the horizontal direction according to a weighted summation, as noted above with reference to FIG. 7A. Thus, the vehicle level failure rate due to the perception errors computed in this manner is considered an inverse (i.e. reciprocal) of the MTBF of the AV (i.e. the MTBF between collisions due to the subset of perception errors). In this way, the computed vehicle-level failure rate is based upon only the rate of the perception errors that are identified as safety-relevant and severe. In contrast, if all perception errors were considered as part of this computation, the computed vehicle-level failure rate would result in an overestimation of the actual vehicle-level failure rate based upon an MTBF between collisions. That is, because more (irrelevant) errors are taken into account, this conventionally leads to a higher failure rate, which represents an overestimation of actual failure rate. Thus, the embodiments described herein increase the accuracy with respect to this computation, which is important with respect to safety certification and perception algorithm development.

Once the vehicle-level failure rate is computed, the process flow 900 further includes the determination (block 920) of whether the AV is in compliance. This may include determining whether the vehicle-level failure rate is less than a predetermined threshold value, whether the MTBF associated with the vehicle-level failure rate is greater than a predetermined threshold value, etc. These predetermined threshold may represent, for example, a predetermined safety standard set by a suitable regulatory authority or Standards Association as discussed herein, or any other suitable threshold.

In some embodiments, the process flow 900 may be used to automatically determine (block 922) whether a target AV complies with the certification of appropriate standard identified with the predetermined threshold value. However, in other embodiments the process flow 900 may optionally include additional processes depending upon whether the AV is in compliance (block 920).

For example, if the target AV fails the compliance test (block 920, No), then the process flow 900 may further include processes that may be performed as part of the developmental stage of the target AV. For example, one or more parameters of the AV perception algorithm may be modified (block 924) and the process flow 900 repeated until the target AV is in compliance (blocks 920, 922). In other words, because the set of situational probabilities provides a highly granular level of data for each mission profile, these situational probabilities may be further analyzed to modify the operation of the AV perception algorithm under specific conditions when the AV fails to pass compliance. This process may include any suitable computing device, which may comprise part of the perception analysis block 808, the computing device 1000 as discussed herein, or any other suitable computing device, executing or communicating with a device that executes the AV perception algorithm, such that the perception metrics 801 are then modified. This results in a change to the safety-relevant and severe perception errors, which may enable a re-calculation of the vehicle-level failure rate. This process may be iteratively performed until the AV meets the predetermined safety standard.

As an illustrative example, the process flow 900 may include an analysis (block 924) of the situational probabilities to determine the specific mission profiles and driving conditions that are correlated with the highest probability of occurrences of Type I and Type II errors. Based upon such an analysis, the AV perception algorithm parameters may then be modified by identifying the type of AV perception algorithms, sensor sources, etc. that are most-often used in such driving situations. For instance, a number of Type I and Type II perception errors may be identified in excess of a predetermined threshold, which are associated with the target AV driving in excess of a particular speed at night. From this analysis, AV perception algorithm parameters such as image sampling rates, parameters identified with image reconstruction, low-light level compensation, etc., may be modified to reduce perception errors for these situations, thereby reducing the overall vehicle level failure rate until the AV meets compliance.

To provide another example, if the target AV fails the compliance test (block 920, No), then the process flow 900 may additionally or alternatively include a modification (block 926) of one or more parameters of the AV driving policy. This may again include any suitable analysis of the situational probabilities to determine the most common situations (e.g. in excess of a predetermined threshold probability) during which Type I and Type II errors occur. Again, the process flow 900 may then be repeated to compute the vehicle-level failure rate and to modify the one or more parameters identified with the driving policy until the vehicle-level failure rate of the AV meets the predetermined safety standard. This may include a modification of the driving policy parameters to reduce the occurrence of the target AV being in particular situations that are more likely to lead to perception errors that may cause collisions.

In other words, because the set of situational probabilities indicates the specific situations in which the target AV perception error rates are most likely to result in a collision, the parameters of the driving policy may be modified to better avoid placing the AV in these situations. The modification of the driving policy parameters results in a change to situational probabilities, which may enable a re-calculation of the vehicle-level failure rate. This process may be iteratively performed until the AV meets the predetermined safety standard. As an illustrative example, the AV driving policy may include safety parameters such as a minimum longitudinal distance between the AV and other vehicles, a minimum lateral distance between the AV and other vehicles, maximum braking force, etc. One or more of these driving policy safety parameters may be modified (e.g. minimum longitudinal and/or lateral distances increased) to make the overall driving policy more "conservative" in nature, thereby avoiding the situations in which perception errors are more prone to causing the AV to be involved in a collision.

Again, the various number and type of predetermined driving conditions within each mission profile are discussed herein by way of example and not limitation. For example, the mission profiles 704.1-704.M as shown in FIGS. 7A-7B include predetermined conditions that comprise categorizations 706 of different speed ranges as well as different specific traffic situations that constitute the potentially dangerous traffic situations that are correlated with the Type I and Type II perception errors. However, additional or alternate predetermined conditions may be included as part of the MTBF probability model, which may be derived from any suitable data source(s) and for which the aforementioned situational probabilities may be computed to determine the overall vehicle-level failure rate resulting from the perception errors.

For example, the duration of the perception errors and/or the duration of the potentially dangerous traffic situation may be included in addition to or instead of the other example predetermined conditions as discussed herein with reference to FIGS. 7A and 7B. As another example, the time between two critical events may be included in addition to or instead of the other example predetermined conditions as discussed herein. To provide an illustrative example, there may be perception errors that last for one second every 100 seconds, as opposed to perception errors that occur for 100 seconds every 1000 seconds. Because these different situations may impact the overall driving failure rate, embodiments include providing categorizations of such metrics under each mission profile such that the perception errors may be further categorized in accordance with ranges of these metrics, in a similar manner as noted above with respect to the speed ranges.

To implement metrics such as the duration and/or intervals between perception errors, the duration of the potentially dangerous traffic conditions, etc., the probability tree 700 as shown in FIG. 7A may be modified to further subdivide the Type I and Type II perception errors based upon these new metrics. Using perception error duration as an example, this may be accomplished, for instance, by adding another level of categorizations that include different perception error duration ranges beneath each mission profile 704.1-704.M, with each one of the categorizations 706.1-706.N of speed ranges (in this example) then branching from each different perception error duration range. Thus, the situational probabilities in each case would include, for each mission profile, computing the probability of the target AV experiencing a perception error having a duration that is within each predetermined duration range and, for each duration, the probabilities of the target AV being within a specific speed range, potentially dangerous traffic situation, etc.

FIG. 10 illustrates a block diagram of an exemplary computing device, in accordance with an aspects of the disclosure. In an aspect, the computing device 1000 as shown and described with respect to FIG. 10 may be identified with a component of the safety system 200 as discussed herein or a separate computing device that may be implemented within the vehicle 100 or in any separate suitable environment. The computing device 1000 may alternatively be identified with one or more portions of the perception analysis block 808, and/or the MTBF analysis block 806, as shown and discussed with reference to FIG. 8. In various embodiments, the computing device 1000 may be identified with any suitable type of standalone computing device such as a desktop computer, laptop, server computer, tablet computer, mobile device, etc. As further discussed below, the computing device 1000 may perform the various functionality as described herein with respect to the process flow 900. To do so, the computing device 1000 may include processing circuitry 1002, a communication interface 1004, and a memory 1006. The components shown in FIG. 10 are provided for ease of explanation, and the computing device 1000 may implement additional, less, or alternative components as those shown in FIG. 10.

The processing circuitry 1002 may be configured as any suitable number and/or type of computer processors, which may function to control the computing device 1000 and/or other components of the computing device 1000. The processing circuitry 1002 may be identified with one or more processors (or suitable portions thereof) implemented by the computing device 1000, and may include processors identified with the safety system 200 as discussed herein (e.g. the one or more processors 102, one or more of the processors 214A, 214B, 216, 218, etc.) The processing circuitry 1000 may be identified with one or more processors such as a host processor, a digital signal processor, one or more microprocessors, graphics processors, baseband processors, microcontrollers, an application-specific integrated circuit (ASIC), part (or the entirety of) a field-programmable gate array (FPGA), etc.

In any event, the processing circuitry 1002 may be configured to carry out instructions to perform arithmetical, logical, and/or input/output (I/O) operations, and/or to control the operation of one or more components of computing device 1000 to perform various functions as described herein, such as the process flow 900 for example. The processing circuitry 1002 may include one or more microprocessor cores, memory registers, buffers, clocks, etc., and may generate electronic control signals associated with the components of the computing device 1000 to control and/or modify the operation of these components. The processing circuitry 1002 may communicate with and/or control functions associated with the communication 1004 and/or the memory 1006.

The processing circuitry 1002 may be configured as any suitable number and/or type of components configured to facilitate the computing device 1000 performing the various functions as discussed herein such as the computation of a vehicle-level failure rate due to perception errors of a target AV, the modification of AV perception algorithm parameters, the modification of driving policy parameters, the automatic determination of whether the target AV passes safety compliance based upon the vehicle-level failure rate, etc.

The communication interface 1004 may be implemented as any suitable number and/or type of components that function to interface with additional devices, and may implement for instance buses, ports, data interfaces, memory controllers, etc. The communication interface 1004 may form part of an overall communication circuitry implemented by the computing device 1000, which may be implemented via the computing device 1000 to communicate with other computing devices to obtain perception error rates and to execute perception algorithms as discussed herein. For instance, the communication interface 1004 may facilitate the computing device 1000 receiving data from databases such as the sensor recording database 802, the naturalistic driving database 804, the safety system 200 of the vehicle 100, etc.

The memory 1006 is configured to store data and/or instructions such that, when the instructions are executed by the processing circuitry 1002, cause the computing device 1000 (or the vehicle 100 and/or safety system 200 of which the computing device 1000 may form a part) to perform various functions as described herein. The memory 1006 may be implemented as any well-known volatile and/or non-volatile memory, including, for example, read-only memory (ROM), random access memory (RAM), flash memory, a magnetic storage media, an optical disc, erasable programmable read only memory (EPROM), programmable read only memory (PROM), etc. The memory 1006 may be non-removable, removable, or a combination of both. The memory 1006 may be implemented as a non-transitory computer readable medium storing one or more executable instructions such as, for example, logic, algorithms, code, etc.

As further discussed below, the instructions, logic, code, etc., stored in the memory 1006 are represented by the various modules as shown in FIG. 10, which may enable the various functions of the aspects as described herein to be functionally realized. Alternatively, if implemented via hardware, the modules shown in FIG. 10 associated with the memory 1006 may include instructions and/or code to facilitate control and/or monitor the operation of such hardware components. In other words, the modules as shown in FIG. 10 are provided for ease of explanation regarding the functional association between hardware and software components. Thus, the processing circuitry 1002 may execute the instructions stored in these respective modules in conjunction with one or more hardware components to perform the various functions as discussed herein.

The perception analysis module 1007 may execute the functionality as discussed herein with reference to the perception analysis block 808 as shown in FIG. 8. The executable instructions stored in the perception analysis module 1007 may facilitate, in conjunction with execution via the processing circuitry 1002, the computing device 1000 receiving data from the sensor recording database 802, performing offline testing against the relevant data accessed via the sensor recording database 802 to identify an initial set of perception errors, and then further analyzing the perception errors to provide a subset of those perception errors that are classified as the Type I and Type II errors as further discussed herein.

The MTBF analysis module 1009 may execute the functionality as discussed herein with reference to the MTBF analysis block 806 as shown in FIG. 8. The executable instructions stored in the MTBF analysis module 1009 may facilitate, in conjunction with execution via the processing circuitry 1002, the computing device 1000 receiving data from the naturalistic driving database 804 to compute the situational probabilities of the target AV driving, for each respective mission profile, in accordance with specific conditions (e.g. speed ranges, being in a potentially dangerous traffic situation, etc.), as further discussed herein. The MTBF analysis module 1009 may also compute the vehicle-level failure rate from the situational probabilities, as noted above.

The executable instructions stored in the certification pass/fail analysis module 1011 may facilitate, in conjunction with execution via the processing circuitry 1002, the computing device 1000 automatically determining whether the target AV meets compliance with a particular predetermine safety threshold and/or standard, as discussed herein with reference to the process flow 900.

The executable instructions stored in the AV perception algorithm modification module 1013 may facilitate, in conjunction with execution via the processing circuitry 1002, the computing device 1000 automatically modifying one or more AV perception algorithm parameters when the target AV fails to meet the compliance criteria. This may include, for instance, an analysis of the situational probabilities and a modification of the AV perception algorithm parameters that allows the target AV to then pass the compliance criteria, as discussed herein with reference to the process flow 900.

The executable instructions stored in the driving policy modification module 1015 may facilitate, in conjunction with execution via the processing circuitry 1002, the computing device 1000 automatically modifying one or more safety parameters of the driving policy when the target AV fails to meet the compliance criteria. This may include, for instance, an analysis of the situational probabilities that allows a modification of the AV driving policy and thus for the AV to adopt a more conservative driving policy to then pass the compliance criteria, as discussed herein with reference to the process flow 900.

Experimental Results

To illustrate how the proposed model may be implemented and to provide practical results, an MTBF model computed in accordance with the techniques described herein was applied to the use case (mission profile) of highway driving (i.e. a speed range between 80 km/h and 180 km/h), restricted to lane following situations. The HighD dataset was used to obtain naturalistic driving data for highways in Germany, which forms the basis to derive the occurrence probabilities $p_S$ for the potentially dangerous situations.

Figure 11:
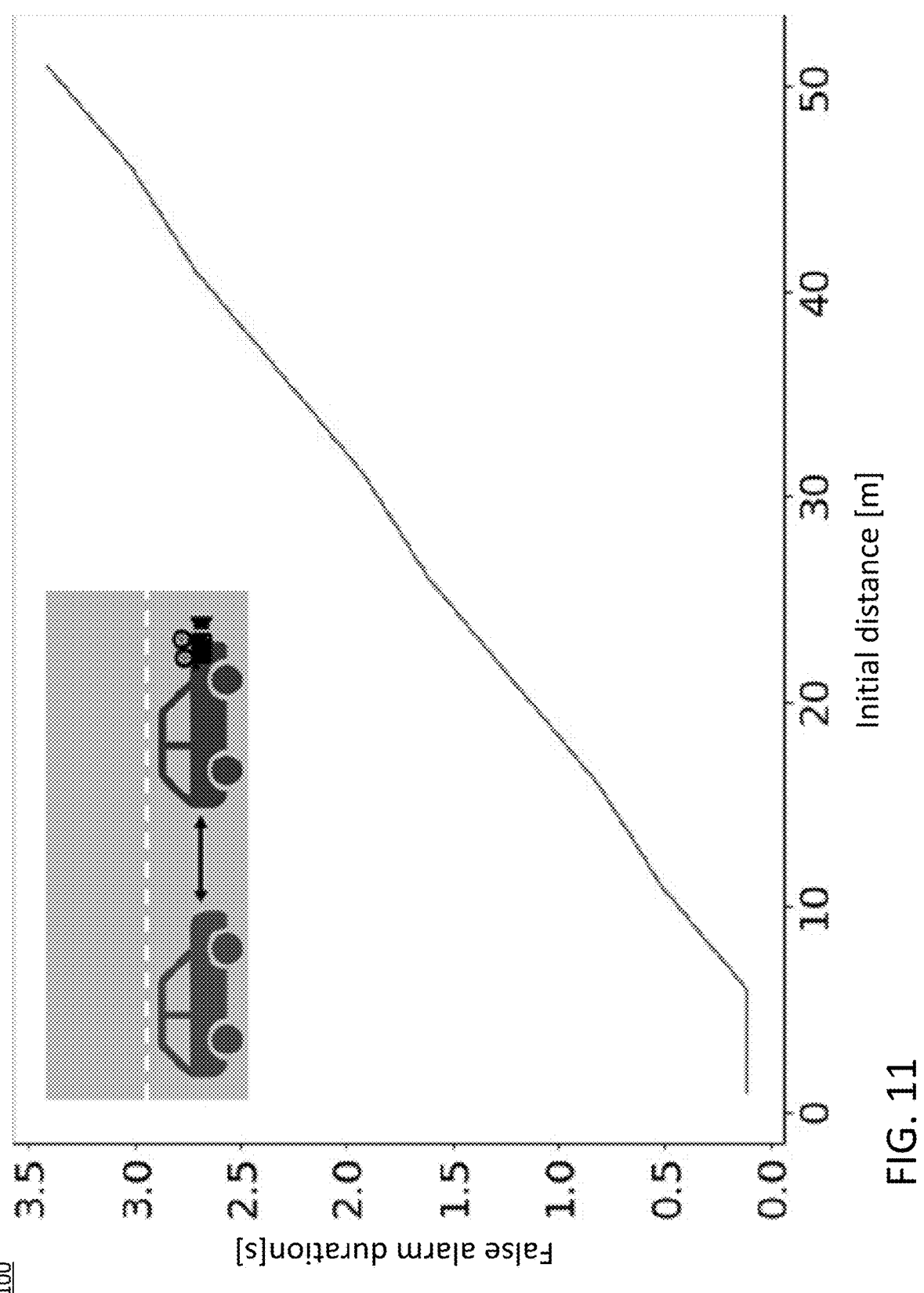
FIG. 11 illustrates an example duration of a false alarm required to cause a S2 or S3 collision, in accordance with one or more aspects of the present disclosure.

Type II perception errors are the focus of this analysis. The reason is that the traffic constellations in the HighD dataset are such that Type I errors, for example false alarms, have to be present for more than 1 second, and have to cause a persistent emergency brake maneuver of the AV to cause noticeable consequences. This is illustrated in further detail in FIG. 11, which identifies the duration of a false alarm required to cause a S2 or S3 collision in case the false alarm causes the lead vehicle to perform a braking maneuver with 8 m/s$^2$ (lead and rear vehicle drive with 130 km/h). For example, a persistent false alarm of 1 second can only cause a S2 or S3 collision if the rear vehicle follows with less than 20 m distance at 130 km/h. It follows that the impact of Type I errors on vehicle-level safety plays an inferior role compared to Type II errors for the mission profile used in this experiment. Similarly, velocity and distance errors are negligible compared to perception misses, thus this section focuses only on the latter.

Provided in further detail below are some baseline numbers for human drivers and a demonstration further discussed regarding how the MTBF model may be implemented to obtain perception quality requirements based on a target MTBF. IT is then shown how a vehicle-level failure rate can be derived using perception data.

Human Driver Baseline

For highway driving, various countries and official authorities gather data, which allows to obtain the failure rate or MTBF (time between two collisions) for human drivers. As often only severe events get reported, the focus is with respect to collisions with S2 and S3 severity according to the ISO 26262, i.e. with severe or fatal injuries. According to an accident report of the German Federal Statistical Office, 19.980 accidents (S2 or S3) were caused in 2019 on German highways, while 252.8 billion kilometers were driven on these roads. Assuming an average speed of 100 km/h, the MTBF of a human driver on a German highway is 1.3*10 hours. This is comparable to the numbers reported by the NHTSA for accidents on roads with speeds beyond 60 mph in U.S.

Based on these reports, it is also possible to obtain a collision severity estimation derived from the delta-velocity of the two road users at collision time. According to the National Highway Traffic Safety Administration—Traffic Safety Facts 2019 and C. Jurewicz, A. Sobhani et al., "Exploration of vehicle impact speed injury severity relationships for application in safer road design," Transportation Research Procedia, vol. 14, pp. 4247-4256, 2016, transport Research Arena TRA2016, a delta velocity of more than 30 km/h results in a severity of S2 or S3.

Therefore, although Definition 3 as discussed herein identifies severe perception errors in accordance with the S2 or S3 severity thresholds as noted above, this is by way of example and not limitation. The embodiments described herein may use any suitable number and/or type of constraints to provide alternate definitions in addition to or instead of those discussed herein. For instance, a set of constraints may be selected that yield safety-relevant perception errors defined as those resulting in a collision of a predetermined level of severity (e.g. S2 or S3) that is based upon a delta-velocity at an expected collision time exceeding a predetermined velocity. This predetermined velocity may include the aforementioned 30 km/h delta-velocity or any other suitable velocity threshold.

Naturalistic Driving Data from HighD

As illustrated in FIG. 8, the model requires naturalistic driving information. Due to the restrictions in this study on highway driving, lane following situations and Type II perception errors (perception misses), m and t can be ignored in Equation (3). Thus, Equation (3) can be simplified to Equation (8) as follows:

$$\lambda = \Sigma_i p_i \times \lambda_i \times p_{S_i}, \qquad \text{Eqn. 8}$$

where $p_i$ represents the probability of driving with a speed in speed range i. $\lambda_i$ represents the perception miss rate in speed range i and $p_{S_i}$ represents the probability of being in potentially dangerous traffic situations for this speed range. In this regard, the relevant situations are as depicted in FIG. 6, namely that the AV is within close distance to a leading vehicle, which either brakes, accelerates, or drives with constant speed. In the latter two cases, the AV has to be faster than the lead vehicle to be relevant. For this reason, "close" to the lead vehicle is defined as a TTC5 (time-to-collision) of less than 5 seconds. Thus, $p_{S_i}$ may be obtained in accordance with Equation (9) as follows:

$$ps_i = p_{d_i} + p_{a_i} \times p_{aTTC,i} + \left(1 - p_{a_i} - p_{d_i}\right) \times p_{cTTC,i}, \qquad \text{Eqn. 9}$$

where $p_{d_i}$ represents the probability of a lead car decelerating in speed range i, $p_{a_i} \times p_{aTTC,i}$ represents the probability that the lead car is sufficiently close $(p_{aTTC,i})$ and accelerates $(p_{a_i})$, and $(1 - p_{a_i} - p_{d_i}) \times p_{cTTC,i}$ represents the probability that the lead car is sufficiently close $(p_{cTTC,i})$ and drives with constant speed $(p_{c_i} = 1 - p_{a_i} - p_{d_i})$.

Figure 12A:
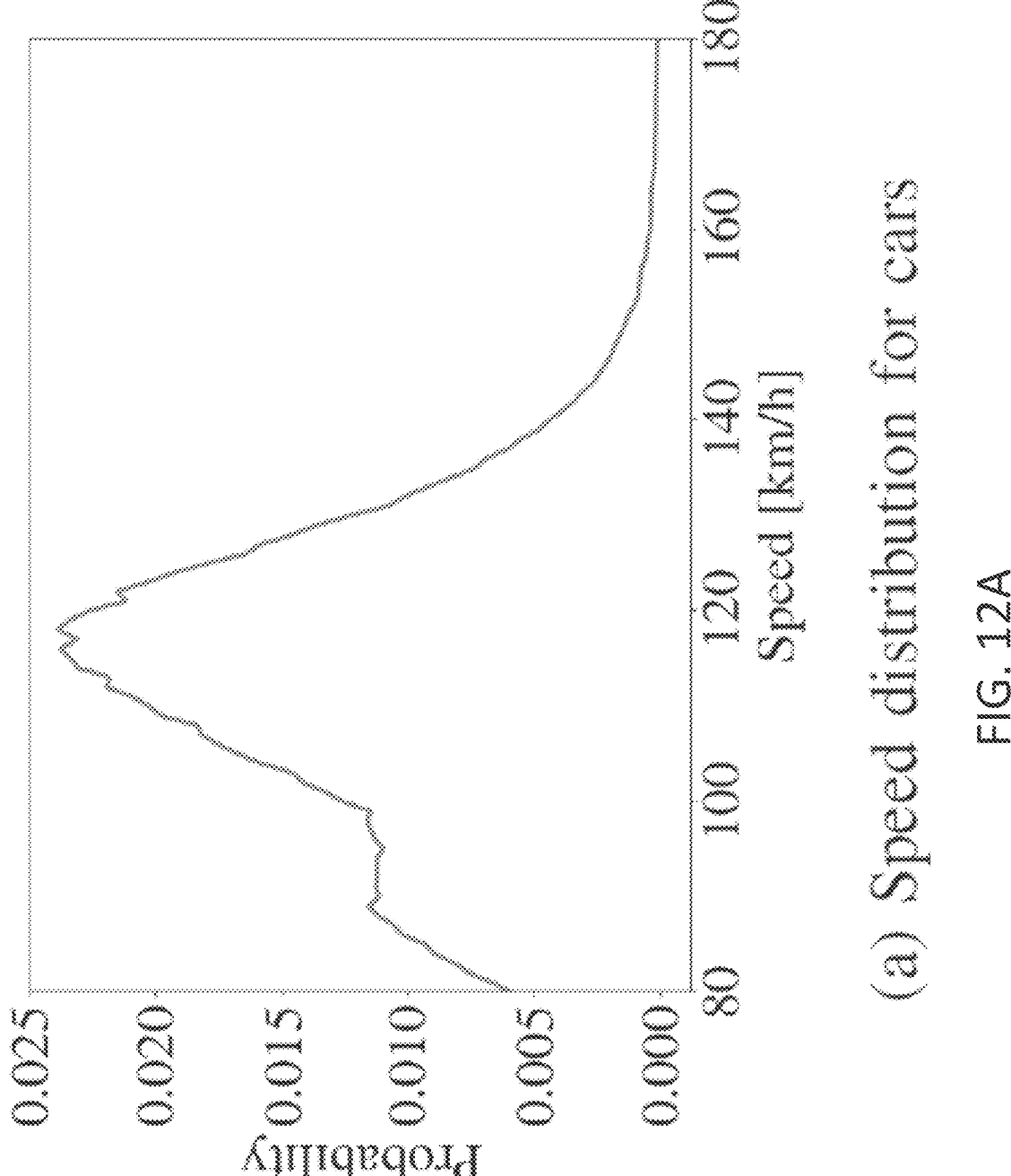
FIG. 12A illustrates an example the speed distribution, in accordance with one or more aspects of the present disclosure.
Figure 12B:
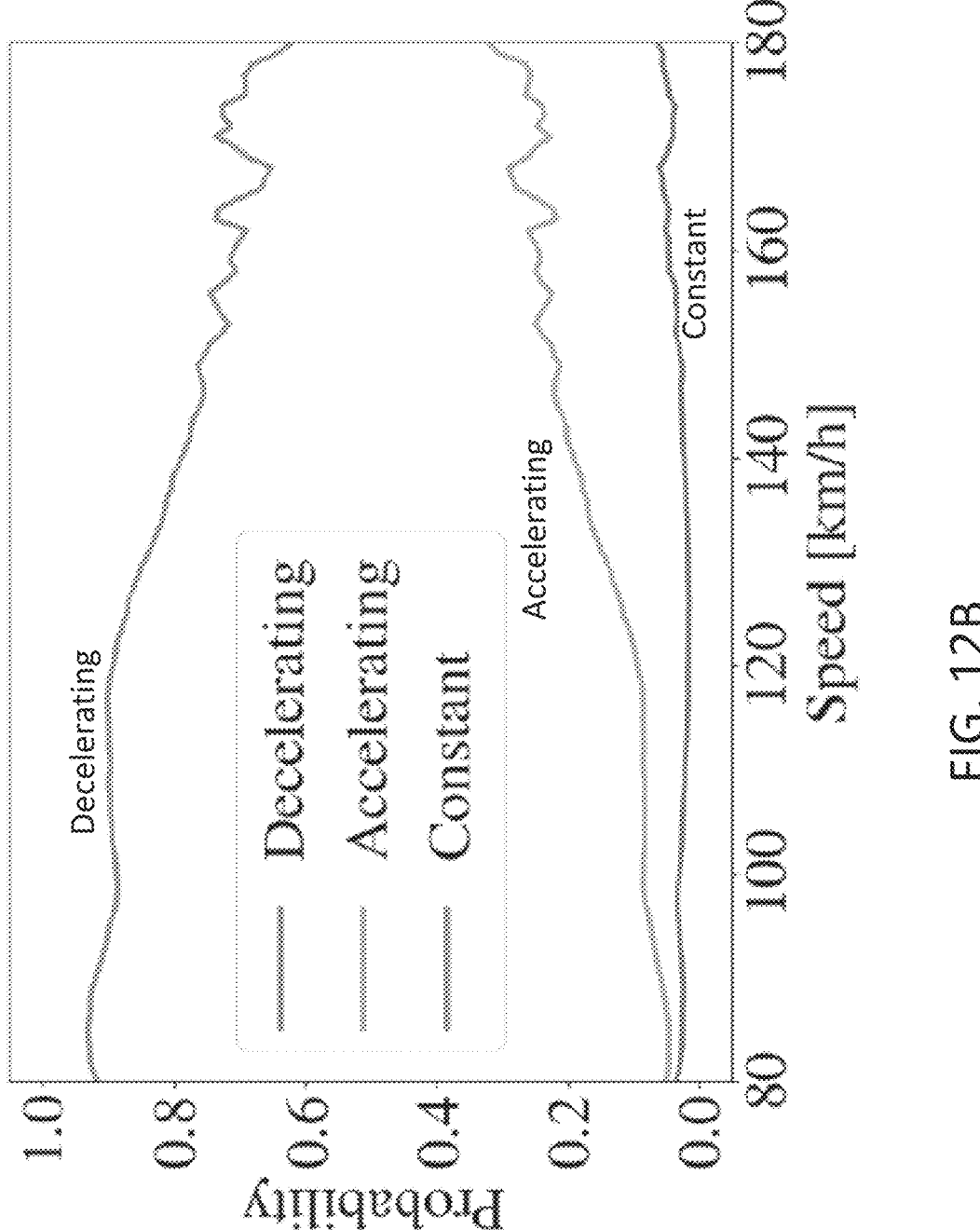
FIG. 12B illustrates an example conditional probabilities for a vehicle accelerating ($p_a$), decelerating ($p_c$) or driving with a constant speed ($p_d$), in accordance with one or more aspects of the present disclosure.
Figure 12C:
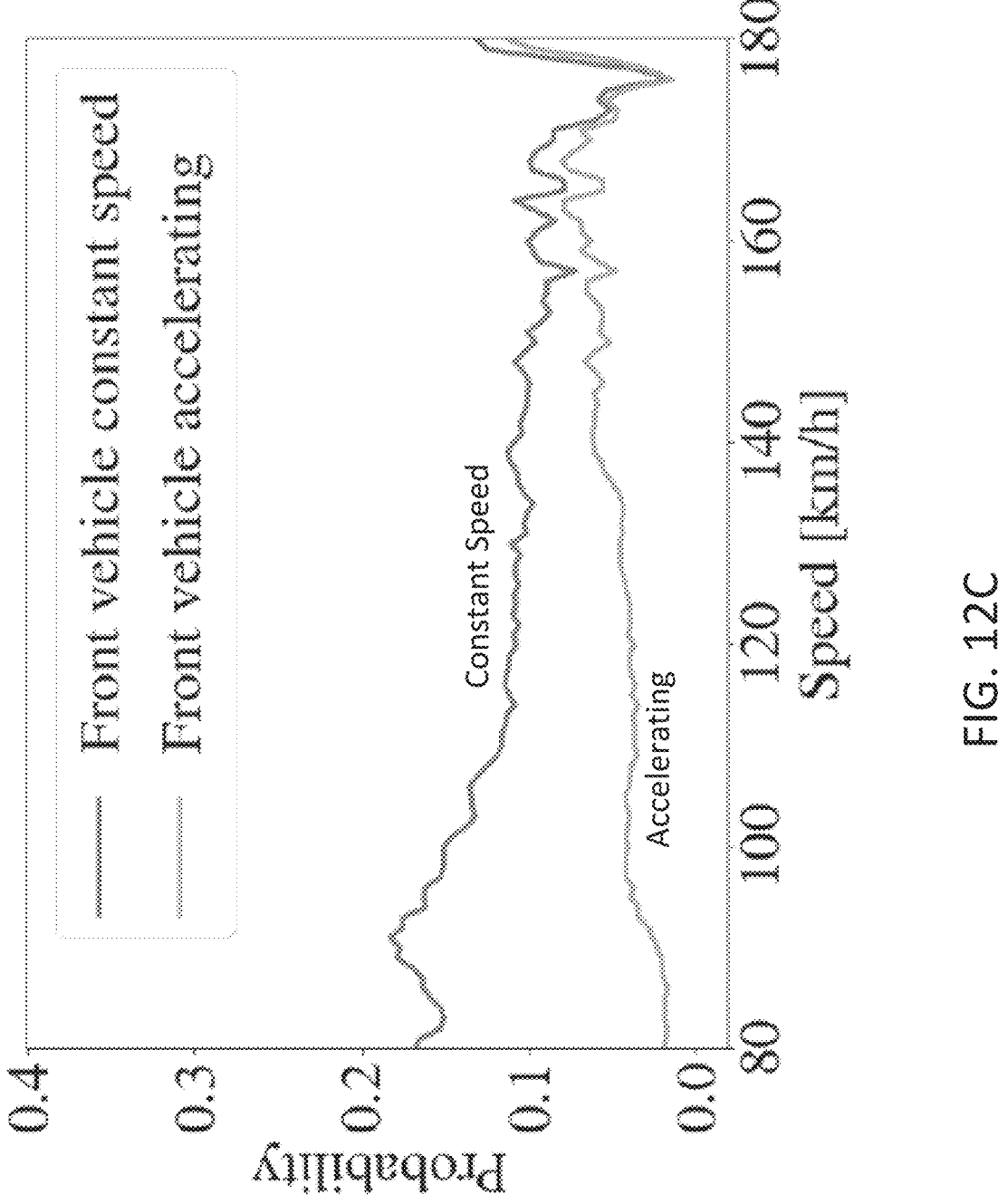
FIG. 12C illustrates an example conditional probability of following a vehicle with relevant distance, in accordance with one or more aspects of the present disclosure.
Figure 13A:
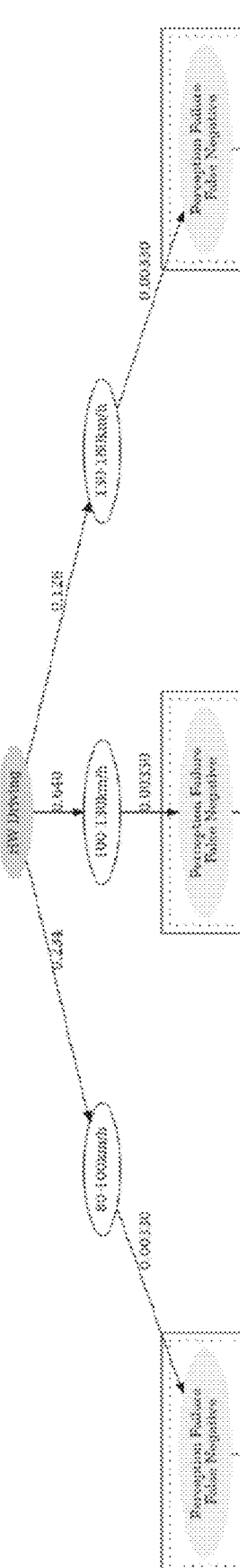
FIGS. 13A-13E illustrate an example MTBF model tree for highway driving based on driving data from HighD and perception data from Lyft.
Figure 13B:
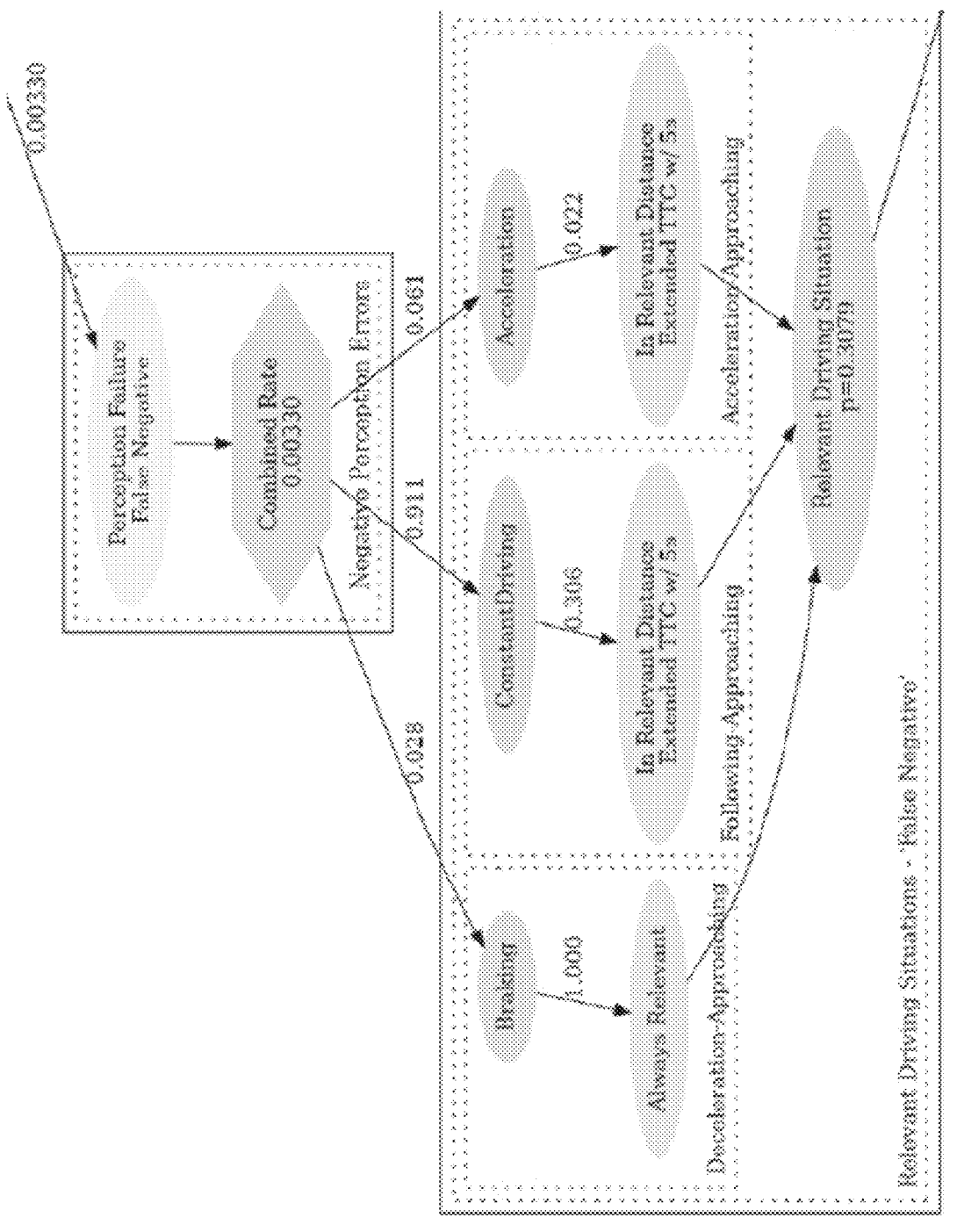
Figure 13C:
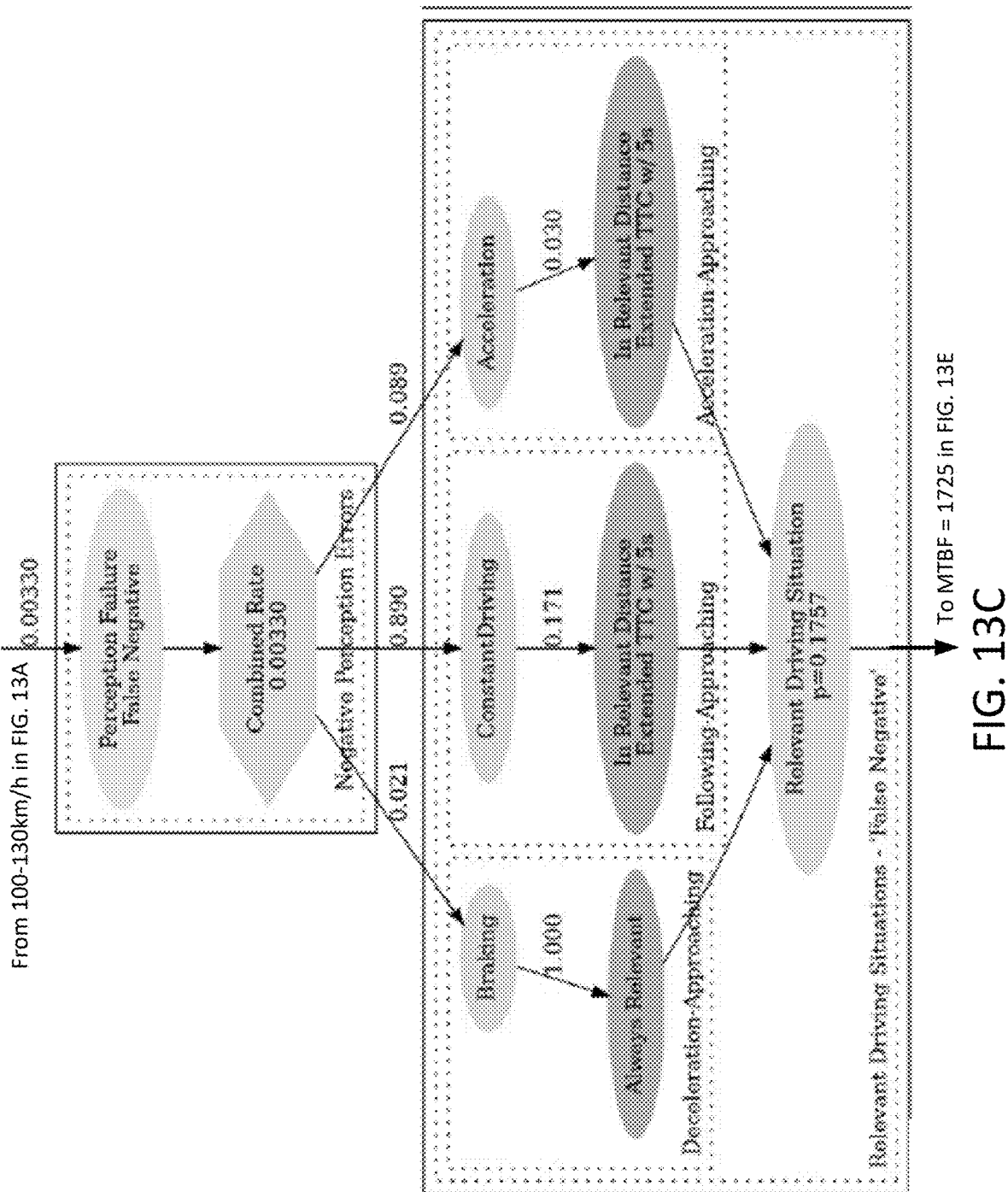
Figure 13D:
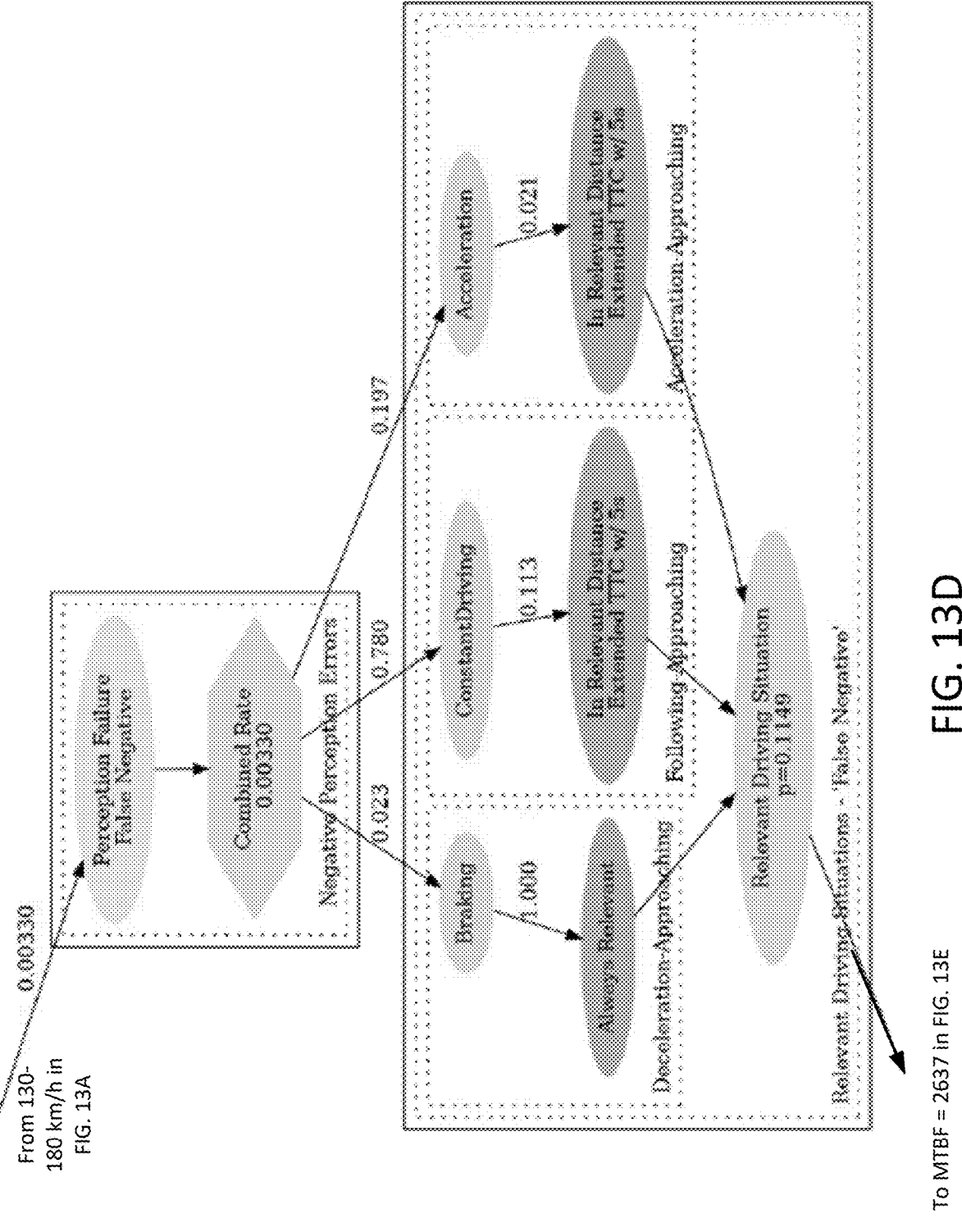
Figure 13E:
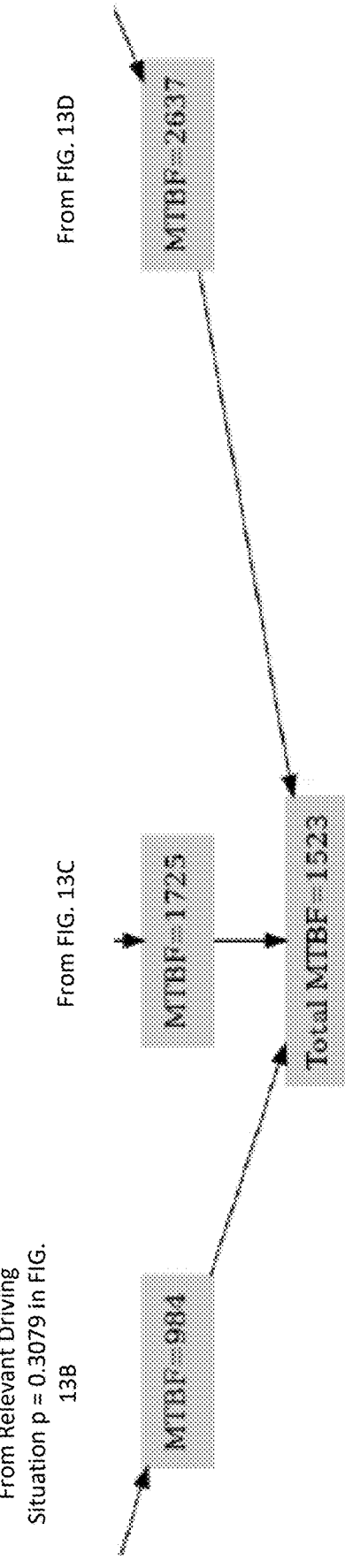
Figure 13E:

All of this information may be extracted from the HighD dataset, which for the purpose of the present experiment is a drone-recorded dataset comprising 150 hours of recording with thousands of vehicles. A subset of the data, relevant for the model, is depicted in FIGS. 12A-12C. FIG. 12A shows the speed distribution, FIG. 12B depicts the conditional probabilities for a vehicle accelerating $(p_a)$, decelerating $(p_c)$ or driving with a constant speed $(p_d)$, and the conditional probability of following a vehicle with relevant distance is represented in FIG. 12C.

As observed, it is advisable to use multiple speed ranges, as for example the probability of a vehicle accelerating increases significantly beyond 130 km/h, while the chance of a car following another car with less than 5 second TTC drops considerably for speeds faster than 100 km/h. As a result, the experiment implements the following speed ranges for this evaluation: 80-100 km/h, 100-130 km/h, and 130-180 km/h. Situations with faster or slower velocities were discarded from the present analysis.

For theses speed ranges, the speed probability, as well as the probabilities for the different potentially dangerous traffic situations, are given in Table I.

TABLE 1

| Speed [km/h] | 80-100 | 100-130 | 130-180 |
|---|---|---|---|
| Speed probability [p_i] | 0.234 | 0.640 | 0.126 |
| Lead vehicle decelerating [p_{d_i}] | 0.028 | 0.021 | 0.023 |
| Lead vehicle decelerating [p_{a_i} × p_{aTTC, i}] | 0.001 | 0.003 | 0.004 |
| Lead vehicle constant speed [p_{c_i} × p_{cTTC, i}] | 0.279 | 0.152 | 0.088 |
| Total situation probability [p_{S_i}] | 0.308 | 0.176 | 0.115 |

As one can infer from Table 1, the probability of a potentially dangerous situation is between 10% to 15%, and the most likely speed range for the selected mission profile is the range between 100-130 km/h with 64.0%. In other words, in 64.0% of the time on a highway a vehicle drives in this speed range, and finds itself in 2.1% of this time in a situation behind a decelerating vehicle, in 0.3% of the time behind a slower but accelerating vehicle, and in 15.2% of the time the vehicle follows another slower vehicle that drives with constant speed. The remaining 82.4% of the time in this speed range, the vehicle is not within a potentially dangerous traffic situation.

Extracting Perception Quality Requirements

Given the situation probabilities as described above, the model illustrated in FIG. 7A may be used to derive the required perception quality (error rates) for a target failure rate at the vehicle-level. Assuming that perception misses (false negatives) are velocity independent, Equation (10) follows from Equation (9) that:

$$\lambda = \Sigma_i \lambda_i \times p_i \times p_{S_i} = \hat{\lambda} \times \Sigma_i p_i \times p_{S_i} =: \hat{\lambda} \times \kappa, \qquad \text{Eqn. 10}$$

where $\hat{\lambda} = \lambda_i$ represents the perception error rate, p(represents the probability of driving within speed range i, $p_{S_i}$ represents the probability of having a potentially dangerous traffic situation in speed range i, and $\kappa$ is defined as $\Sigma_i p_i \times p_{S_i}$.

Consequently, by defining a target value for $\lambda$, $\hat{\lambda}$ may be derived. For the speed ranges used in this experiment, and according to Table I, $\kappa = 0.176$, which leads to the results presented in Table 2 below.

35

TABLE 2

| Target Vehicle-Level MTBF | Perception Error Rate |
|---|---|
| $10^4$ hours | $5.0 \times 10^{-4}$ errors/hour |
| $10^5$ hours (=human MTBF) | $5.0 \times 10^{-5}$ errors/hour |
| $10^6$ hours | $5.0 \times 10^{-6}$ errors/hour |
| $10^7$ hours | $5.0 \times 10^{-7}$ errors/hour |

In other words, only 19.9% of all severe perception errors can manifest as vehicle-level failures. As a result, severe perception misses have to be less frequent than $10^{-4}$ to achieve an overall vehicle-level MTBF that is comparable to human drivers (MTBF=$1.3 \times 10^5$ for severe accidents as explained above).

IT is noted that the starting assumption that perception misses are velocity-independent may not hold entirely in practice. On one hand, the physical properties of any sensing system do not change with speed, thus the probability for missing an object that is n meters away from the sensor does not change either. On the other hand, the further objects are away from the sensor, the more likely these will not be detected. At the same time, higher speeds require longer safety distances, and thus perception misses that are further away from the AV become relevant with increasing speeds. Thus, the assumptions holds as long as the sensor reach is more than the required safety distances (e.g. according to the particular SDM, such as the RSS), and as an AV should never drive with such speeds, so the assumption is reasonable.

From Perception Errors to Vehicle-Level Failures

The model may also be implemented to derive the vehicle-level failure rates from perception error rates, as explained above. To illustrate this, an experiment was performed that leveraged the Lyft dataset (R. Kesten, M. Usman et al., "Level 5 perception dataset 2020," https://level-5.global/level5/data/, 2019) to obtain perception error rates using a LiDAR based object detector, called PointPillars. The situational probabilities are again extracted from the HighD dataset, as explained above. As there is no publicly available large-enough perception dataset for highways available, the Lyft dataset was selected as a suitable alternative.

To estimate the MTBF for AV accidents with S2 or S3 severity, only severe perception misses were considered according to Definition 3. Furthermore, as the Lyft perception dataset does not provide detailed object velocity information, a potential worst-case behavior is assumed, i.e. that the leading vehicle stands still and that the AV drives with maximum allowed speed for the given road type. Lyft covers 25200 Frames (equivalent to 1.4 hours of recording). Recorded LiDAR data was then evaluated using PointPillars and found 3 safety-relevant perception misses with severity S2 or S3, with a total duration of 17 frames. Thus, the severe perception miss rate (frames with misses per second) is 17/5040 s=12.1 errors/second. Assuming that this is velocity independent (as noted above), this can be combined with the situational probabilities from the HighD dataset. Consequently, as depicted in FIGS. 12A-12E, the overall vehicle-level MTBF is 1523 second (0.4 hours), which is significantly below the targeted MTFB of a human driver ($10^5$ hours). In this regard, it is worth noting that the key contributor to this value seems to be the slowest speed range, due to a higher rate of potentially dangerous traffic situations.

An example MTBF model tree for highway driving based on driving data from HighD and perception data from Lyft, which was obtained as part of the experiment, is shown in FIGS. 13A-13E. The MTBF model is divided into several Figures for ease of presentation, but forms part of the entire MTBF model in this example.

Again, the duration of the perception errors and/or their frequency may be further considered as an extension of the MTBF model and resulting vehicle-level failure rate. For instance, in the experiment noted herein, every frame was handled an entirely new situation. For example, if in 1000 consecutive frames, a single perception miss event occurs that lasts for 500 frames, we consider this as 500 misses resulting in a perception error rate of 0.5. However, if there are 100 miss events each with a duration of 5 frames, the error rate is also 0.5. Yet, in practice, there is a significant difference among both cases. For this reason, the MTBF model may be extended to further consider the duration of perception errors as well as potentially dangerous traffic situations.

It is further noted that the chosen perception system is an academic realization with a recall of around 90%. In a real AV, a much more comprehensive perception solution could be used comprising of multiple camera, LiDAR, and Radar sensors. Consequently, it is expected that the perception quality will be significantly better for real-world cases. The realization at hand was chosen to illustrate how the MTBF model may be used and fed with data.

EXAMPLES

The following examples pertain to further aspects.

An example (e.g. example 1) relates to a computer-implemented method. The computer-implemented method comprises: identifying, via one or more processors, perception errors as a result of execution of an autonomous vehicle (AV) perception algorithm implemented via an AV that operates in accordance with a driving policy; providing, via one or more processors, a subset of the perception errors that are (i) safety-relevant to the AV based upon a first predetermined set of constraints, and (ii) identified with a severity that exceeds a threshold severity based upon a second predetermined set of constraints; correlating, via one or more processors, each perception error from among the subset of perception errors to a respective set of predetermined driving conditions to determine a perception error rate per each respective set of predetermined driving conditions; accessing, via one or more processors, data from a naturalistic driving dataset to compute a set of situational probabilities, each respective one of the situational probabilities corresponding to a probability of the AV driving in conditions that match each of the respective set of predetermined driving conditions; computing, via one or more processors, a vehicle-level failure rate of the AV due to the perception errors based upon the set of situational probabilities and the perception error rate per each respective set of predetermined driving conditions; and determining whether the AV is compliant with a predetermined safety standard based upon the vehicle-level failure rate.

Another example (e.g. example 2) relates to a previously-described example (e.g. example 1), further comprising: when the vehicle-level failure rate of the AV fails to meet the predetermined safety standard, modifying, via one or more processors, one or more parameters identified with the AV perception algorithm based upon the set of situational probabilities, and repeating the computer-implemented method to compute the vehicle-level failure rate and to modify the one or more parameters identified with the AV perception algorithm until the vehicle-level failure rate of the AV meets the predetermined safety standard.

Another example (e.g. example 3) relates to a previously-described example (e.g. one or more of examples 1-2), further comprising: when the vehicle-level failure rate of the AV fails to meet predetermined safety standard, modifying, via one or more processors, one or more parameters of the driving policy based upon the set of situational probabilities; and repeating the computer-implemented method to compute the vehicle-level failure rate and to modify the one or more parameters identified with the driving policy until the vehicle-level failure rate of the AV meets the predetermined safety standard, wherein the one or more parameters identified with the driving policy that are modified include at least one of (i) a minimum longitudinal distance between the AV and other vehicles, and (ii) a minimum lateral distance between the AV and other vehicle, while the AV is driving.

Another example (e.g. example 4) relates to a previously-described example (e.g. one or more of examples 1-3), wherein the vehicle-level failure rate represents an inverse of a mean time between failure (MTBF) of the AV due to the subset of perception errors resulting in a collision.

Another example (e.g. example 5) relates to a previously-described example (e.g. one or more of examples 1-4), wherein the first predetermined set of constraints that define perception errors as safety-relevant perception errors yield only perception errors that result in a change in a safety decision of a planning system of the AV, and wherein the second predetermined set of constraints yield only safety-relevant perception errors that may result in a collision with a S2 or S3 severity according to the International Organization for Standardization (ISO) 26262 Standard.

Another example (e.g. example 6) relates to a previously-described example (e.g. one or more of examples 1-5), wherein each respective set of predetermined driving conditions represents a combination of (i) a predetermined speed range, and (ii) a predetermined set of conditions that define a potentially dangerous traffic situation.

Another example (e.g. example 7) relates to a previously-described example (e.g. one or more of examples 1-6), wherein the act of computing the vehicle-level failure rate based upon the perception errors comprises: computing the vehicle-level failure rate based upon a combination of the set of situational probabilities that are computed for each respective set of predetermined driving conditions.

Another example (e.g. example 8) relates to a previously-described example (e.g. one or more of examples 1-7), wherein the second predetermined set of constraints yield only safety-relevant perception errors that may result in a collision of a predetermined level of severity that is based upon a delta-velocity at an expected collision time exceeding a predetermined velocity.

Another example (e.g. example 9) relates to a previously-described example (e.g. one or more of examples 1-8), wherein the perception errors are identified by accessing sensor data from a database, and w % ben the sensor data stored in the sensor database is less than a threshold size, then identifying the perception errors using data augmentation.

An example (e.g. example 10) relates a computing device. The computing device comprises: a memory configured to store computer-readable instructions; and one or more processors configured to execute the computer readable instructions stored in the memory to: identify perception errors as a result of execution of an autonomous vehicle (AV) perception algorithm implemented via an AV that operates in accordance with a driving policy; provide a subset of the perception errors that are (i) safety-relevant to the AV based upon a first predetermined set of constraints, and (ii) identified with a severity that exceeds a threshold severity based upon a second predetermined set of constraints; correlate each perception error from among the subset of perception errors to a respective set of predetermined driving conditions to determine a perception error rate per each respective set of predetermined driving conditions; access data from a naturalistic driving dataset to compute a set of situational probabilities, each respective one of the situational probabilities corresponding to a probability of the AV driving in conditions that match each of the respective set of predetermined driving conditions: compute a vehicle-level failure rate of the AV due to the perception errors based upon the set of situational probabilities and the perception error rate per each respective set of predetermined driving conditions; and determine whether the AV is compliant with a predetermined safety standard based upon the vehicle-level failure rate.

Another example (e.g. example 11) relates to a previously-described example (e.g. example 10), wherein the computer-readable instructions stored on the memory, when executed by the one or more processors, further cause the computing device to: when the vehicle-level failure rate of the AV fails to meet the predetermined safety standard, modify one or more parameters identified with the AV perception algorithm based upon the set of situational probabilities; and repeat the computing of the vehicle-level failure rate and the modifying of the one or more parameters identified with the AV perception algorithm until the vehicle-level failure rate of the AV meets the predetermined safety standard.

Another example (e.g. example 12) relates to a previously-described example (e.g. one or more of examples 10-11), wherein the computer-readable instructions stored on the memory, when executed by the one or more processors, further cause the computing device to: when the vehicle-level failure rate of the AV fails to meet predetermined safety standard, modify one or more parameters of the driving policy based upon the set of situational probabilities; and repeat the computing of the vehicle-level failure rate and the modifying of the one or more parameters identified with the AV perception algorithm until the vehicle-level failure rate of the AV meets the predetermined safety standard, wherein the one or more parameters identified with the driving policy that are modified include at least one of (i) a minimum longitudinal distance between the AV and other vehicles, and (ii) a minimum lateral distance between the AV and other vehicle, while the AV is driving.

Another example (e.g. example 13) relates to a previously-described example (e.g. one or more of examples 10-12), wherein the vehicle-level failure rate represents an inverse of a mean time between failure (MTBF) of the AV due to the subset of perception errors resulting in a collision.

Another example (e.g. example 14) relates to a previously-described example (e.g. one or more of examples 10-13), wherein the first predetermined set of constraints that define perception errors as safety-relevant perception errors includes only perception errors that result in a change in a safety decision of a planning system of the AV, and wherein the second predetermined set of constraints includes only safety-relevant perception errors that may result in a collision with a S2 or S3 severity according to the International Organization for Standardization (ISO) 26262 Standard.

Another example (e.g. example 15) relates to a previously-described example (e.g. one or more of examples 10-14), wherein each respective set of predetermined driving conditions represents a combination of (i) a predetermined speed range, and (ii) a predetermined set of conditions that define a potentially dangerous traffic situation.

Another example (e.g. example 16) relates to a previously-described example (e.g. one or more of examples 10-15), wherein the computer-readable instructions stored on the memory, when executed by the one or more processors, further cause the computing device to compute the vehicle-level failure rate based upon the perception errors by computing the vehicle-level failure rate based upon a combination of the set of situational probabilities that are computed for each respective set of predetermined driving conditions.

An example (e.g. example 17) relates to a non-transitory computer-readable medium. The non-transitory computer-readable medium has instructions stored thereon that, when executed by processing circuitry of a computing device, cause the computing device to: identify perception errors as a result of execution of an autonomous vehicle (AV) perception algorithm implemented via an AV that operates in accordance with a driving policy; provide a subset of the perception errors that are (i) safety-relevant to the AV based upon a first predetermined set of constraints, and (ii) identified with a severity that exceeds a threshold severity based upon a second predetermined set of constraints; correlate each perception error from among the subset of perception errors to a respective set of predetermined driving conditions to determine a perception error rate per each respective set of predetermined driving conditions; access data from a naturalistic driving dataset to compute a set of situational probabilities, each respective one of the situational probabilities corresponding to a probability of the AV driving in conditions that match each of the respective set of predetermined driving conditions; compute a vehicle-level failure rate of the AV due to the perception errors based upon the set of situational probabilities and the perception error rate per each respective set of predetermined driving conditions; and determine whether the AV is compliant with a predetermined safety standard based upon the vehicle-level failure rate.

Another example (e.g. example 18) relates to a previously-described example (e.g. example 17), wherein the computer-readable instructions, when executed by the processing circuitry, further cause the computing device to: when the vehicle-level failure rate of the AV fails to meet the predetermined safety standard, modify one or more parameters identified with the AV perception algorithm based upon the set of situational probabilities; and repeat the computing of the vehicle-level failure rate and the modifying of the one or more parameters identified with the AV perception algorithm until the vehicle-level failure rate of the AV meets the predetermined safety standard.

Another example (e.g. example 19) relates to a previously-described example (e.g. one or more of examples 17-18), wherein the computer-readable instructions, when executed by the processing circuitry, further cause the computing device to: when the vehicle-level failure rate of the AV fails to meet predetermined safety standard, modify one or more parameters of the driving policy based upon the set of situational probabilities; and repeat the computing of the vehicle-level failure rate and the modifying of the one or more parameters identified with the AV perception algorithm until the vehicle-level failure rate of the AV meets the predetermined safety standard.

Another example (e.g. example 20) relates to a previously-described example (e.g. one or more of examples 17-19), wherein the one or more parameters identified with the driving policy that are modified include at least one of (i)

a minimum longitudinal distance between the AV and other vehicles, and (ii) a minimum lateral distance between the AV and other vehicle, while the AV is driving.

Another example (e.g. example 21) relates to a previously-described example (e.g. one or more of examples 17-20), wherein the vehicle-level failure rate represents an inverse of a mean time between failure (MTBF) of the AV due to the subset of perception errors resulting in a collision.

Another example (e.g. example 22) relates to a previously-described example (e.g. one or more of examples 17-21), wherein the first predetermined set of constraints that define perception errors as safety-relevant perception errors includes only perception errors that result in a change in a safety decision of a planning system of the AV, and wherein the second predetermined set of constraints includes only safety-relevant perception errors that may result in a collision with a S2 or S3 severity according to the International Organization for Standardization (ISO) 26262 Standard.

Another example (e.g. example 23) relates to a previously-described example (e.g. one or more of examples 17-22), wherein each respective set of predetermined driving conditions represents a combination of (i) a predetermined speed range, and (ii) a predetermined set of conditions that define a potentially dangerous traffic situation.

Another example (e.g. example 24) relates to a previously-described example (e.g. one or more of examples 17-23), wherein the computer-readable instructions stored on the memory, when executed by the processing circuitry, further cause the computing device to compute the vehicle-level failure rate based upon the perception errors by computing the vehicle-level failure rate based upon a combination of the set of situational probabilities that are computed for each respective set of predetermined driving conditions A method as shown and described.

An apparatus as shown and described.

A method as shown and described.

CONCLUSION

The various embodiments discussed herein provided various results for different use cases of a proposed vehicle-level MTBF model. To draw adequate conclusions, it is however important to keep several key aspects in mind, which. First, when using such a probabilistic model in combination with large datasets, it is important to ensure that the datasets contain sufficient and relevant information for the mission profile under evaluation to derive results with reasonable confidence values. For example, although the HighD dataset is very comprehensive, convergence studies show that the speed distribution (probability density function) changes considerably with every track file evaluated (e.g. using a Kolmogorov-Smirnov test). In other words, the speed distribution obtained from the HighD dataset is not a sufficient representation of naturalistic highway driving behavior in Germany. A similar study is required for the perception database, where it is advisable to evaluate if all relevant traffic constellations are represented, or that all illumination and weather conditions relevant for the mission profile are sufficiently covered.

If the available data is limited, it is advisable to reduce the model complexity, for example by using fewer (yet broader) speed ranges, or to not differentiate between daylight driving and driving at night. In this case, reasonably chosen assumptions might be the better choice than using a finely-grained model that produces results with poor confidence. Of course, a coarser model will come at the cost of a less precise MTBF estimation (i.e. higher variance, but better confidence).

Another way of handling limited dataset is to apply data augmentation. For example, by using a worst-case assumption that all not-detected objects stand still, the analysis will provide a lower-bound for the vehicle-level MTBF values. Yet, it is important to note that performing data augmentation may bias the evaluation, resulting in an over-representation of worst-case situations. Hence, data augmentation should be applied carefully, and should be considered for the perception error rate estimation as well as for the corresponding potentially dangerous driving situations. For instance, one can split the model into two sub-trees, one with augmentation (stand still) and add to the potentially dangerous traffic situation the probability that a vehicle approaches a standing obstacle, and another sub-tree without augmentation.

It is also important to be aware that e.g. the HighD naturalistic driving data is based on human drivers, and that an AV behaves entirely different which may result in fewer/more potentially dangerous traffic situations. This difference should be considered for the failure rate estimation.

The aforementioned description of the specific aspects will so fully reveal the general nature of the disclosure that others can, by applying knowledge within the skill of the art, readily modify and/or adapt for various applications such specific aspects, without undue experimentation, and without departing from the general concept of the present disclosure. Therefore, such adaptations and modifications are intended to be within the meaning and range of equivalents of the disclosed aspects, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

References in the specification to "one aspect," "an aspect," "an exemplary aspect," etc., indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

The exemplary aspects described herein are provided for illustrative purposes, and are not limiting. Other exemplary aspects are possible, and modifications may be made to the exemplary aspects. Therefore, the specification is not meant to limit the disclosure. Rather, the scope of the disclosure is defined only in accordance with the following claims and their equivalents.

Aspects may be implemented in hardware (e.g., circuits), firmware, software, or any combination thereof. Aspects may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact results from computing devices, processors, controllers, or other devices executing the firmware, software, routines, instructions, etc. Further, any of the implementation variations may be carried out by a general purpose computer.

For the purposes of this discussion, the term "processing circuitry" or "processor circuitry" shall be understood to be circuit(s), processor(s), logic, or a combination thereof. For example, a circuit can include an analog circuit, a digital circuit, state machine logic, other structural electronic hardware, or a combination thereof. A processor can include a microprocessor, a digital signal processor (DSP), or other hardware processor. The processor can be "hard-coded" with instructions to perform corresponding function(s) according to aspects described herein. Alternatively, the processor can access an internal and/or external memory to retrieve instructions stored in the memory, which when executed by the processor, perform the corresponding function(s) associated with the processor, and/or one or more functions and/or operations related to the operation of a component having the processor included therein.

In one or more of the exemplary aspects described herein, processing circuitry can include memory that stores data and/or instructions. The memory can be any well-known volatile and/or non-volatile memory, including, for example, read-only memory (ROM), random access memory (RAM), flash memory, a magnetic storage media, an optical disc, erasable programmable read only memory (EPROM), and programmable read only memory (PROM). The memory can be non-removable, removable, or a combination of both.

What is claimed is:

1. A computing device, comprising:

a memory configured to store computer-readable instructions; and one or more processors configured to execute the computer readable instructions stored in the memory to:

identify perception errors as a result of execution of a perception algorithm implemented via a vehicle comprising an autonomous or a semi-autonomous vehicle, which operates in accordance with a driving policy;

provide a subset of the perception errors that (i) satisfy a first predetermined set of constraints that define the perception errors as safety-relevant to the vehicle due to the perception errors resulting in a change in a safety decision of a planning system of the vehicle, and (ii) further satisfy a second predetermined set of constraints that define the perception errors as being severe due to the perception errors resulting in a collision that exceeds a predefined severity threshold;

correlate each perception error from among the subset of perception errors to a respective set of predetermined driving conditions to determine a perception error rate per each respective set of predetermined driving conditions;

access data from a driving dataset to compute a set of situational probabilities, each respective one of the situational probabilities corresponding to a probability of the vehicle driving in conditions that match each of the respective set of predetermined driving conditions;

compute a vehicle-level failure rate of the vehicle due to the perception errors based upon the set of situational probabilities and the perception error rate per each respective set of predetermined driving conditions;

determine whether the vehicle is compliant with a predetermined safety goal based upon the vehicle-level failure rate; and when the vehicle is not compliant with the predetermined safety goal, modify a manner in which the perception algorithm is executed for one or more of the respective set of predetermined driving conditions until the vehicle is compliant with the predetermined safety goal.

2. The computing device of claim 1, wherein the computer-readable instructions stored on the memory, when executed by the one or more processors, further cause the computing device to:

when the vehicle-level failure rate of the vehicle fails to meet the predetermined safety goal, modify, via one or more processors, one or more parameters identified with the perception algorithm based upon the set of situational probabilities; and repeat the computing of the vehicle-level failure rate and the modifying of the one or more parameters identified with the perception algorithm until the vehicle-level failure rate of the vehicle meets the predetermined safety goal.

3. The computing device of claim 1, wherein the computer-readable instructions stored on the memory, when executed by the one or more processors, further cause the computing device to:

when the vehicle-level failure rate of the vehicle fails to meet the predetermined safety goal, modify, via one or more processors, one or more parameters of the driving policy based upon the set of situational probabilities; and repeat the computing of the vehicle-level failure rate and the modifying of the one or more parameters identified with the driving policy until the vehicle-level failure rate of the vehicle meets the predetermined safety goal, wherein the one or more parameters identified with the driving policy that are modified include at least one of (i) a minimum longitudinal distance between the vehicle and other vehicles, and (ii) a minimum lateral distance between the vehicle and other vehicles while the vehicle is driving.

4. The computing device of claim 1, wherein the vehicle-level failure rate represents an inverse of a mean time between failure (MTBF) of the vehicle due to the subset of perception errors resulting in a collision.

5. The computing device of claim 1, wherein the predefined severity threshold comprises a S2 or S3 severity according to the International Organization for Standardization (ISO) 26262 Standard.

6. The computing device of claim 1, wherein each respective set of predetermined driving conditions represents a combination of (i) a predetermined speed range, and (ii) a predetermined set of conditions that define a potentially dangerous traffic situation.

7. The computing device of claim 6, wherein the computer-readable instructions stored on the memory, when executed by the one or more processors, further cause the computing device to:

compute the vehicle-level failure rate based upon a combination of the set of situational probabilities that are computed for each respective set of predetermined driving conditions.

8. The computing device of claim 1, wherein the second predetermined set of constraints yield only safety-relevant perception errors that may result in a collision of a predetermined level of severity that is based upon a delta-velocity at an expected collision time exceeding a predetermined velocity.

9. The computing device of claim 1, wherein the computer-readable instructions stored on the memory, when executed by the one or more processors, further cause the computing device to identify the perception errors by accessing sensor data from a database, and when the sensor data stored in the sensor database is less than a threshold size, to identify the perception errors using data augmentation.

10. A non-transitory computer-readable medium having instructions stored thereon that, when executed by processing circuitry of a computing device, cause the computing device to:

identify perception errors as a result of execution of a perception algorithm implemented via a vehicle comprising an autonomous or a semi-autonomous vehicle, which operates in accordance with a driving policy;

provide a subset of the perception errors that (i) satisfy a first predetermined set of constraints that define the perception errors as safety-relevant to the vehicle due to the perception errors resulting in a change in a safety decision of a planning system of the vehicle, and (ii) further satisfy a second predetermined set of constraints that define the perception errors as being severe due to the perception errors resulting in a collision that exceeds a predefined severity threshold;

correlate each perception error from among the subset of perception errors to a respective set of predetermined driving conditions to determine a perception error rate per each respective set of predetermined driving conditions;

access data from a driving dataset to compute a set of situational probabilities, each respective one of the situational probabilities corresponding to a probability of the vehicle driving in conditions that match each of the respective set of predetermined driving conditions;

compute a vehicle-level failure rate of the vehicle due to the perception errors based upon the set of situational probabilities and the perception error rate per each respective set of predetermined driving conditions;

determine whether the vehicle is compliant with a predetermined safety goal based upon the vehicle-level failure rate; and when the vehicle is not compliant with the predetermined safety goal, modify a manner in which the perception algorithm is executed for one or more of the respective set of predetermined driving conditions until the vehicle is compliant with the predetermined safety goal.

11. The non-transitory computer-readable medium of claim 10, wherein the computer-readable instructions, when executed by the processing circuitry, further cause the computing device to:

when the vehicle-level failure rate of the vehicle fails to meet the predetermined safety goal, modify one or more parameters identified with the perception algorithm based upon the set of situational probabilities; and repeat the computing of the vehicle-level failure rate and the modifying of the one or more parameters identified with the perception algorithm until the vehicle-level failure rate of the vehicle meets the predetermined safety goal.

12. The non-transitory computer-readable medium of claim 10, wherein the computer-readable instructions, when executed by the processing circuitry, further cause the computing device to:

when the vehicle-level failure rate of the vehicle fails to meet the predetermined safety goal, modify one or more parameters of the driving policy based upon the set of situational probabilities; and repeat the computing of the vehicle-level failure rate and the modifying of the one or more parameters of the driving policy until the vehicle-level failure rate of the vehicle meets the predetermined safety goal.

13. A computing device, comprising:

a memory configured to store computer-readable instructions; and one or more processors configured to execute the computer readable instructions stored in the memory to:

identify perception errors as a result of execution of a perception algorithm implemented via a vehicle comprising an autonomous or a semi-autonomous vehicle, which operates in accordance with a driving policy;

provide, via one or more processors, a subset of the perception errors that (i) satisfy a first predetermined set of constraints that define the perception errors as safety-relevant to the vehicle due to the perception errors resulting in a change in a safety decision of a planning system of the vehicle, and (ii) further satisfy a second predetermined set of constraints that define the perception errors as being severe due to the perception errors resulting in a collision that exceeds a predefined severity threshold;

correlate, via one or more processors, each perception error from among the subset of perception errors to a respective set of predetermined driving conditions to determine a perception error rate per each respective set of predetermined driving conditions;

access, via one or more processors, data from a driving dataset to compute a set of situational probabilities, each respective one of the situational probabilities corresponding to a probability of the vehicle driving in conditions that match each of the respective set of predetermined driving conditions;

compute, via one or more processors, a vehicle-level failure rate of the vehicle due to the perception errors based upon the set of situational probabilities and the perception error rate per each respective set of predetermined driving conditions;

determine whether the vehicle is compliant with a predetermined safety goal based upon the vehicle-level failure rate; and when the vehicle-level failure rate of the vehicle fails to meet the predetermined safety goal, modify, via one or more processors, one or more parameters of the driving policy based upon the set of situational probabilities until the vehicle-level failure rate of the vehicle meets the predetermined safety goal.

14. The computing device of claim 13, wherein the computer-readable instructions stored on the memory, when executed by the one or more processors, further cause the computing device to:

when the vehicle-level failure rate of the vehicle fails to meet the predetermined safety goal, modify one or more parameters identified with the perception algorithm based upon the set of situational probabilities; and repeat the computing of the vehicle-level failure rate and the modifying of the one or more parameters identified with the perception algorithm until the vehicle-level failure rate of the vehicle meets the predetermined safety goal.

15. The computing device of claim 13, wherein the computer-readable instructions stored on the memory, when executed by the one or more processors, further cause the computing device to:

repeat the computing of the vehicle-level failure rate and the modifying of the one or more parameters identified with the driving policy until the vehicle-level failure rate of the vehicle meets the predetermined safety goal, wherein the one or more parameters identified with the driving policy that are modified include at least one of (i) a minimum longitudinal distance between the vehicle and other vehicles, and (ii) a minimum lateral distance between the vehicle and other vehicles while the vehicle is driving.

16. The computing device of claim 13, wherein the vehicle-level failure rate represents an inverse of a mean time between failure (MTBF) of the vehicle due to the subset of perception errors resulting in a collision.

17. The computing device of claim 13, wherein the predefined severity threshold comprises a S2 or S3 severity according to the International Organization for Standardization (ISO) 26262 Standard.

18. The computing device of claim 13, wherein each respective set of predetermined driving conditions represents a combination of (i) a predetermined speed range, and (ii) a predetermined set of conditions that define a potentially dangerous traffic situation.

19. The computing device of claim 18, wherein the computer-readable instructions stored on the memory, when executed by the one or more processors, further cause the computing device to:

compute the vehicle-level failure rate based upon a combination of the set of situational probabilities that are computed for each respective set of predetermined driving conditions.

20. The computing device of claim 13, wherein the second predetermined set of constraints yield only safety-relevant perception errors that may result in a collision of a predetermined level of severity that is based upon a delta-velocity at an expected collision time exceeding a predetermined velocity.

21. The computing device of claim 13, wherein the computer-readable instructions stored on the memory, when executed by the one or more processors, further cause the computing device to identify the perception errors by accessing sensor data from a database, and when the sensor data stored in the sensor database is less than a threshold size, to identify the perception errors using data augmentation.

22. A non-transitory computer-readable medium having instructions stored thereon that, when executed by processing circuitry of a computing device, cause the computing device to:

identify perception errors as a result of execution of a perception algorithm implemented via a vehicle comprising an autonomous or a semi-autonomous vehicle, which operates in accordance with a driving policy;

provide a subset of the perception errors that (i) satisfy a first predetermined set of constraints that define the perception errors as safety-relevant to the vehicle due to the perception errors resulting in a change in a safety decision of a planning system of the vehicle, and (ii)

further satisfy a second predetermined set of constraints that define the perception errors as being severe due to the perception errors resulting in a collision that exceeds a predefined severity threshold;

correlate each perception error from among the subset of perception errors to a respective set of predetermined driving conditions to determine a perception error rate per each respective set of predetermined driving conditions;

access data from a driving dataset to compute a set of situational probabilities, each respective one of the situational probabilities corresponding to a probability of the vehicle driving in conditions that match each of the respective set of predetermined driving conditions;

compute a vehicle-level failure rate of the vehicle due to the perception errors based upon the set of situational probabilities and the perception error rate per each respective set of predetermined driving conditions;

determine whether the vehicle is compliant with a predetermined safety goal based upon the vehicle-level failure rate; and when the vehicle-level failure rate of the vehicle fails to meet the predetermined safety goal, modify, via one or more processors, one or more parameters of the driving policy based upon the set of situational probabilities until the vehicle-level failure rate of the vehicle meets the predetermined safety goal.

23. The non-transitory computer-readable medium of claim 22, wherein the computer-readable instructions, when executed by the processing circuitry, further cause the computing device to:

when the vehicle-level failure rate of the vehicle fails to meet the predetermined safety goal, modify, via one or more processors, one or more parameters identified with the perception algorithm based upon the set of situational probabilities; and repeat the computer-implemented method to compute the vehicle-level failure rate and to modify the one or more parameters identified with the perception algorithm until the vehicle-level failure rate of the vehicle meets the predetermined safety goal.

24. The non-transitory computer-readable medium of claim 22, wherein the computer-readable instructions, when executed by the processing circuitry, further cause the computing device to modify the one or more parameters of the driving policy by repeating the computer-implemented method to compute the vehicle-level failure rate and to modify the one or more parameters identified with the driving policy until the vehicle-level failure rate of the vehicle meets the predetermined safety goal, and wherein the one or more parameters identified with the driving policy that are modified include at least one of (i) a minimum longitudinal distance between the vehicle and other vehicles, and (ii) a minimum lateral distance between the vehicle and other vehicles while the vehicle is driving.

25. The computing device of claim 1, wherein the predetermined safety goal comprises a threshold Mean Time Between Failure (MTBF) defined in accordance with the International Organization for Standardization (ISO) 26262 Standard.

* * * * *